(12) United States Patent
Lee et al.

(10) Patent No.: US 12,485,333 B2
(45) Date of Patent: Dec. 2, 2025

(54) MULTI-STIMULATION NEUROREHABILITATION ASSISTANT SYSTEM

(71) Applicants: Asia University, Taichung (TW); METABRAIN TECHNOLOGY PTE. LTD., Singapore (SG)

(72) Inventors: Shin-Da Lee, Taichung (TW); Shu-Ya Chen, Taichung (TW); Chen-Chao Hsu, Taichung (TW)

(73) Assignees: ASIA UNIVERSITY, Taichung (TW); METABRAIN TECHNOLOGY PTE.LTD., Singapore (SG)

( * ) Notice: Subject to any disclaimer, the term of this patent is extended or adjusted under 35 U.S.C. 154(b) by 376 days.

(21) Appl. No.: 17/895,674

(22) Filed: Aug. 25, 2022

(65) Prior Publication Data
US 2023/0069700 A1    Mar. 2, 2023

(30) Foreign Application Priority Data
Aug. 27, 2021   (TW) .................................. 110131812

(51) Int. Cl.
*A61H 39/00*   (2006.01)
*A63B 21/00*   (2006.01)
(Continued)

(52) U.S. Cl.
CPC .......... *A63B 71/0622* (2013.01); *A63B 21/22* (2013.01); *A63B 22/0605* (2013.01)

(58) Field of Classification Search
CPC ........ A61H 7/006; A61H 39/00; A61H 39/04; A61H 2201/1604; A61H 2201/10;
(Continued)

(56) References Cited

U.S. PATENT DOCUMENTS

2006/0167371 A1* 7/2006 Flaherty ................. G06N 3/061
                                                                    600/545
2009/0011907 A1* 1/2009 Radow ..................... B62M 3/00
                                                                    482/57

(Continued)

*Primary Examiner* — Justine R Yu
*Assistant Examiner* — Christopher E Miller
(74) *Attorney, Agent, or Firm* — MUNCY, GEISSLER, OLDS & LOWE, P.C.

(57) ABSTRACT

A multi-stimulation neurorehabilitation assistant system includes a support unit, an audio stimulation unit, an acupoint stimulation unit, an electronic stimulation unit, a training unit, a display and optical frequency-flashed stimulation unit, and a control unit. The support unit includes a rotatable top-side portion over the top of the user's head. The audio stimulation unit includes two speakers. The acupoint stimulation unit includes several acupoint agents. The electronic stimulation unit includes several electronic stimulation agents. The training unit can sense a user's own movements to output measurement signals. The display and optical frequency-flashed stimulation unit can be switched between a display mode and an optical frequency-flashed stimulation mode. The control unit is electrically connected with the speakers, the acupoint agents, the electrical stimulation agents, the training unit and the display and optical frequency-flashed stimulation unit, so that users can obtain multiple stimulations at the same time during rehabilitation.

18 Claims, 20 Drawing Sheets
(3 of 20 Drawing Sheet(s) Filed in Color)

(51) Int. Cl.
*A63B 21/22* (2006.01)
*A63B 22/06* (2006.01)
*A63B 71/06* (2006.01)

(58) Field of Classification Search
CPC .......... A61N 5/06; A61N 5/067; A61N 5/073; A61N 5/08; A61N 2005/0647; A61N 1/0456; A61N 1/36025; A63B 2213/00; A63B 2213/004
See application file for complete search history.

(56) References Cited

U.S. PATENT DOCUMENTS

| | | | |
|---|---|---|---|
| 2009/0221928 A1* | 9/2009 | Einav | A61B 5/4076 |
| | | | 601/5 |
| 2011/0015707 A1* | 1/2011 | Tucker | A61N 5/0617 |
| | | | 607/90 |
| 2016/0066838 A1* | 3/2016 | DeCharms | A61B 5/4064 |
| | | | 434/236 |
| 2016/0235323 A1* | 8/2016 | Tadi | A61B 5/0006 |
| 2017/0165485 A1* | 6/2017 | Sullivan | A61B 5/0022 |
| 2017/0216577 A1* | 8/2017 | Nguyen | A61B 5/369 |
| 2019/0247662 A1* | 8/2019 | Poltroak | A61N 1/0534 |
| 2020/0069966 A1* | 3/2020 | Porter | G02B 27/0172 |
| 2020/0329991 A1* | 10/2020 | Ushiba | A61B 5/6803 |
| 2020/0382884 A1* | 12/2020 | Chang | A61H 39/00 |
| 2021/0134463 A1* | 5/2021 | Mason | A61B 5/7405 |
| 2022/0187913 A1* | 6/2022 | Averkiev | G06F 3/014 |
| 2022/0387818 A1* | 12/2022 | Sverdlov | A61B 5/372 |

* cited by examiner

MULTI-STIMULATION NEUROREHABILITATION ASSISTANT SYSTEM

BACKGROUND OF THE INVENTION

Field of the Invention

The present invention relates to a rehabilitation system, in particular to a multi-stimulation neurorehabilitation assistant system.

Description of the Prior Art

The existing neurorehabilitation program directly use a neurorehabilitation equipment or a neurological therapeutic approach in neurorehabilitation clinics. For example, when rehabilitating impaired hands or brains, the corresponding hands or brain nerves can be trained by constantly taking and moving the rehabilitation equipment, and after repeated training or receiving brain stimulation in the other time, the rehabilitation patients can gradually return to the normal level from either training or brain stimulation.

However, without integrating brain stimulation and body training, the effectiveness of rehabilitation is not high enough. Without interaction, it is very monotonous and boring to perform the same actions repeatedly, which leads to the fact that it is easy for rehabilitation patients to stop training.

SUMMARY OF THE INVENTION

Therefore, the aim of the present invention is to provide a multi-stimulation neurorehabilitation assistant system that could overcome the above mentioned disadvantages.

Therefore, the multi-stimulation neurorehabilitation assistant system of the present invention is used by a user. The multi-stimulation neurorehabilitation assistant system includes a support unit, an audio stimulation unit, an acupoint stimulation unit, an electronic stimulation unit, a training unit, a display and optical frequency-flashed stimulation unit, and a control unit.

The support unit corresponds to the user's head shape, and includes two ears portions corresponding to both ears of the user, and the top-side portion rotatably connected between the ears portions and spanning upwardly over the top of the user's head. The audio stimulation unit includes two speakers respectively arranged on the ears portions. The speakers are used to broadcast a binaural beats with frequency following response to the user's ears, and the frequency following response music has an audio frequency difference. The acupoint stimulation unit includes several acupoint agents that can be arranged on the support unit in an position-adjustable manner, and the acupoint agents are used for physical stimulation of the irradiated light output to the acupoints of the user's head. The electronic stimulation unit includes several electronic stimulation agents that can be positioned at the support unit in a position-adjustable manner. The electronic stimulation agents provide at least one of the physical stimulations: electrical current to the user's head for transcranial electrical stimulation, and electromagnetic pulses to the user's head for transcranial magnetic stimulation. The training unit can sense user's own movements to output measurement signals. The display and optical frequency-flashed stimulation unit can be switched between a display mode and an optical frequency-flashed stimulation mode. In the display mode, the display and optical frequency-flashed stimulation unit is used for displaying images. In the optical frequency-flashed stimulation mode, the display and optical frequency-flashed stimulation unit is used for displaying a flickering picture. The control unit is electrically connected to the speakers, the acupoint agents, the electronic stimulation agents, the training unit, and the display and optical frequency-flashed stimulation unit, to store digital information of the binaural beats with frequency following response and images, and according to a preset command, can simultaneously control the speakers to broadcast the binaural beats with frequency following response, control the acupoint agents to emit physical stimulation, control the electronic stimulation agents to emit physical stimulation, and control the display and optical frequency-flashed stimulation unit to switch between the display mode and the optical frequency-flashed stimulation mode, and can receive and change according to the measurement signal in the display mode image.

The efficacy of the present invention lies in that by arranging the speakers, the acupoint agents, the electronic stimulation agents, the training unit and the display and optical frequency-flashed stimulation unit, the user can obtain multiple stimulations at the same time during rehabilitation, and the images in the display mode can further provide fun and increase the user's willingness to use.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Other features and effects of the present invention will appear clearly in the embodiments with reference to the drawings, in which.

DETAILED DESCRIPTION OF THE PREFERRED EMBODIMENTS

Before the present invention is described in detail, it should be noted that in the following description, similar elements are denoted by the same numbers.

Figure 1:
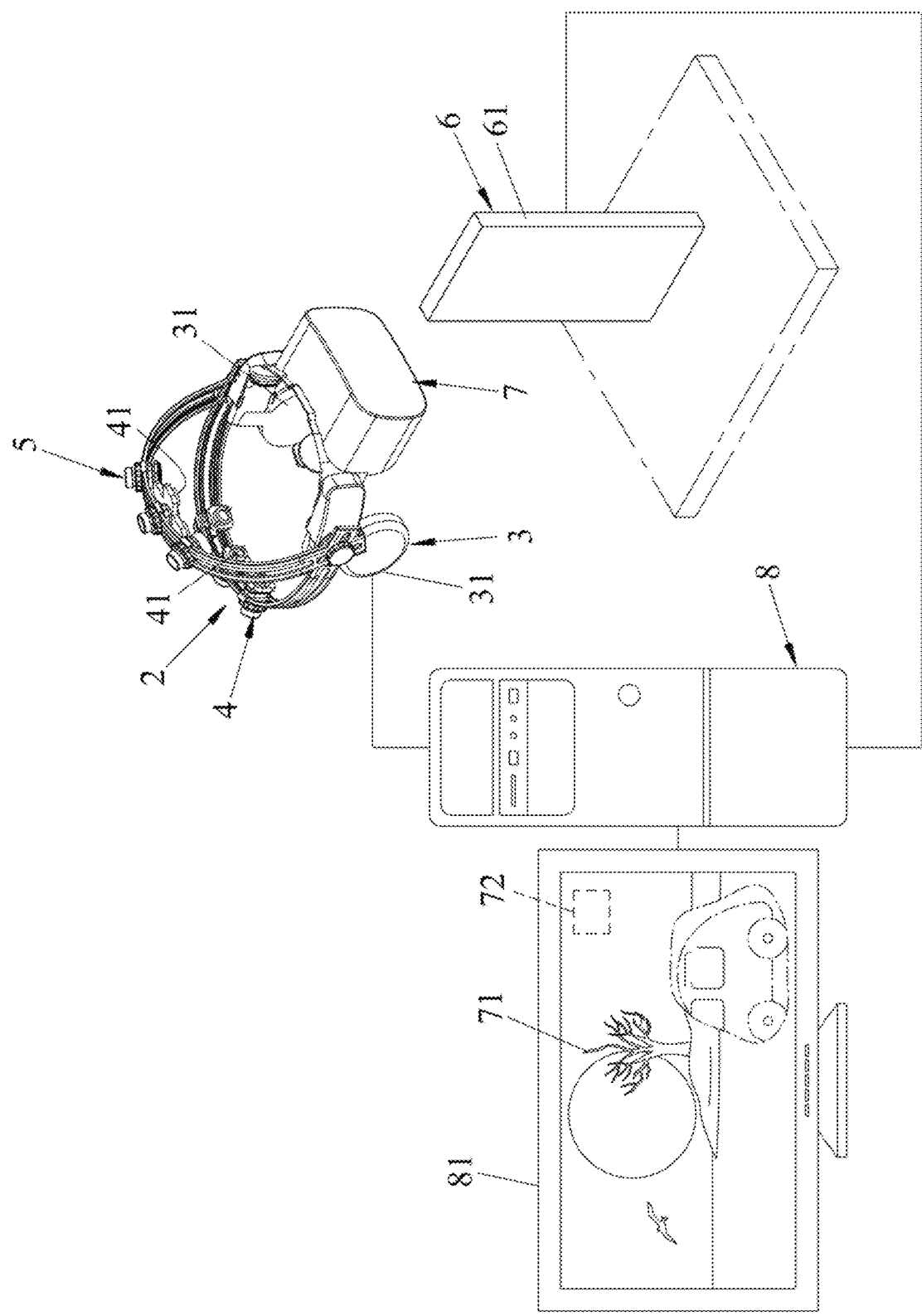
FIG. 1 is a schematic diagram of the first embodiment of the multi-stimulation neurorehabilitation assistant system of the present invention.
Figure 2:
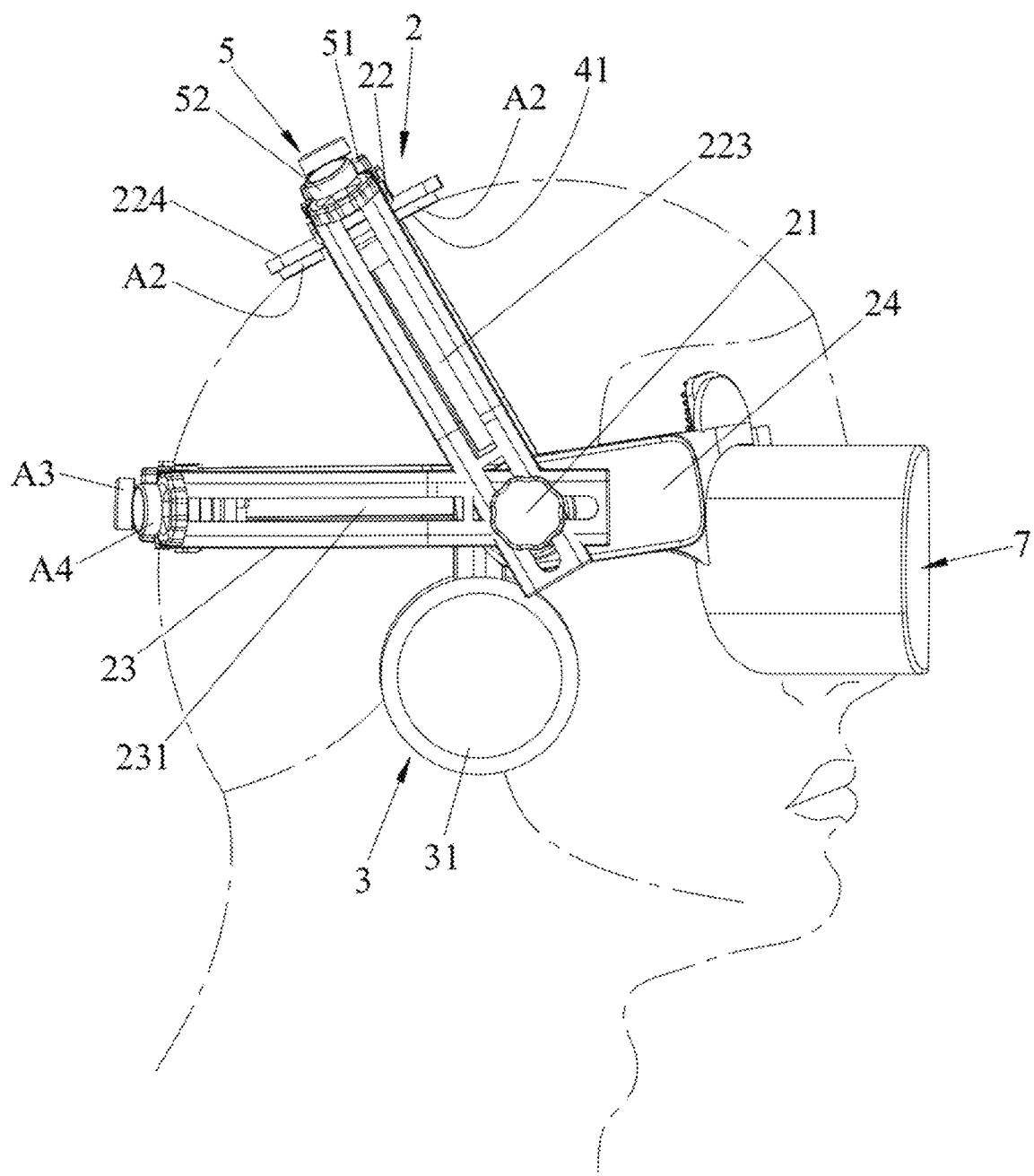
FIG. 2 is a side view of the support unit, the audio stimulation unit, the acupoint stimulation unit, the electronic stimulation unit and the display and optical frequency-flashed stimulation unit of the first embodiment.
Figure 3:
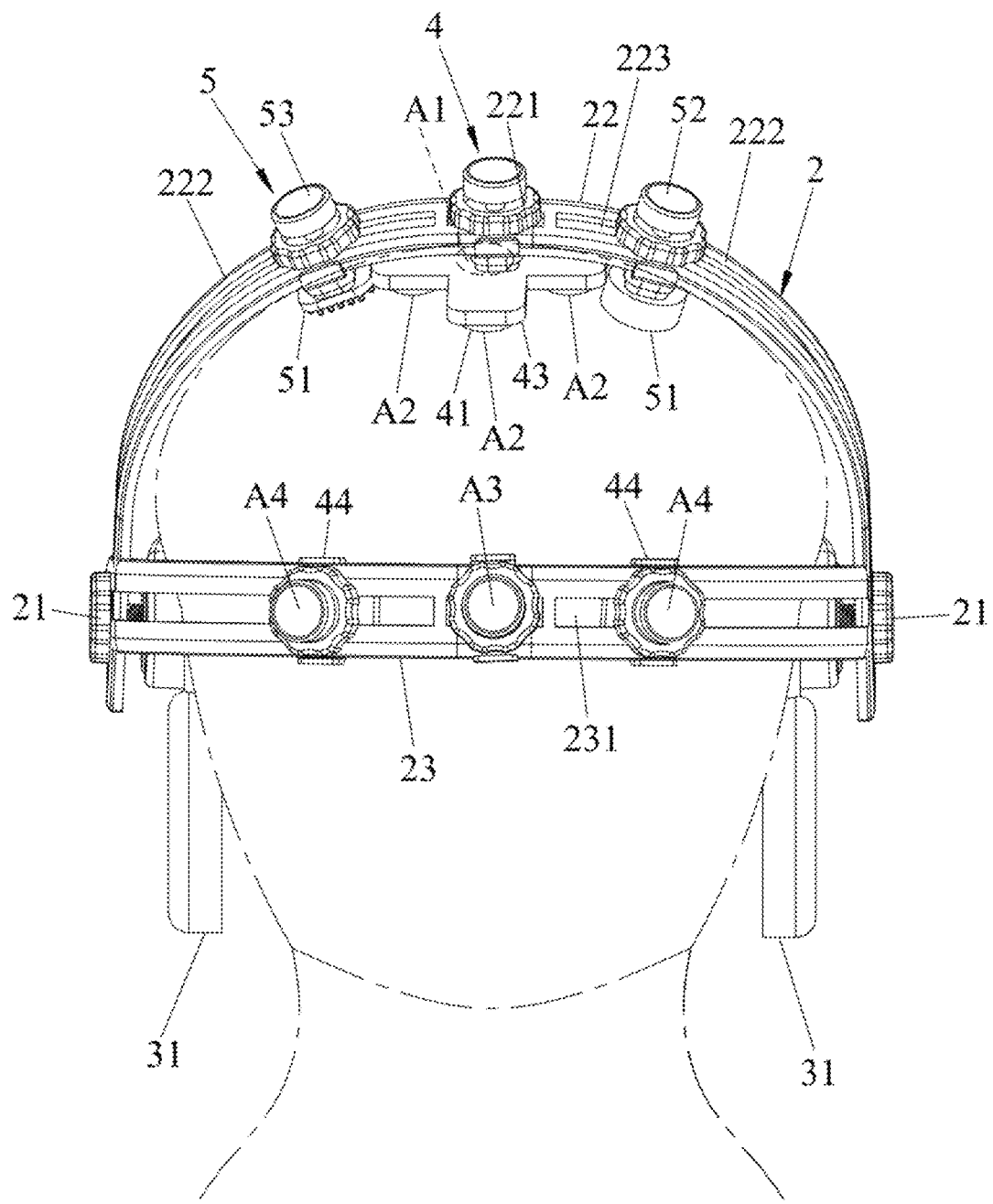
FIG. 3 is a rear view of the support unit, the audio stimulation unit, the acupoint stimulation unit, the electronic stimulation unit and the display and optical frequency-flashed stimulation unit of the first embodiment.

Referring to FIGS. 1, 2 and 3, the first embodiment of the multi-stimulation neurorehabilitation assistant system of the present invention is used by a user. The multi-stimulation neurorehabilitation assistant system includes a support unit 2, an audio stimulation unit 3, an acupoint stimulation unit 4, an electronic stimulation unit 5, a training unit 6, a display and optical frequency-flashed stimulation unit 7, and a control unit 8.

Figure 4:
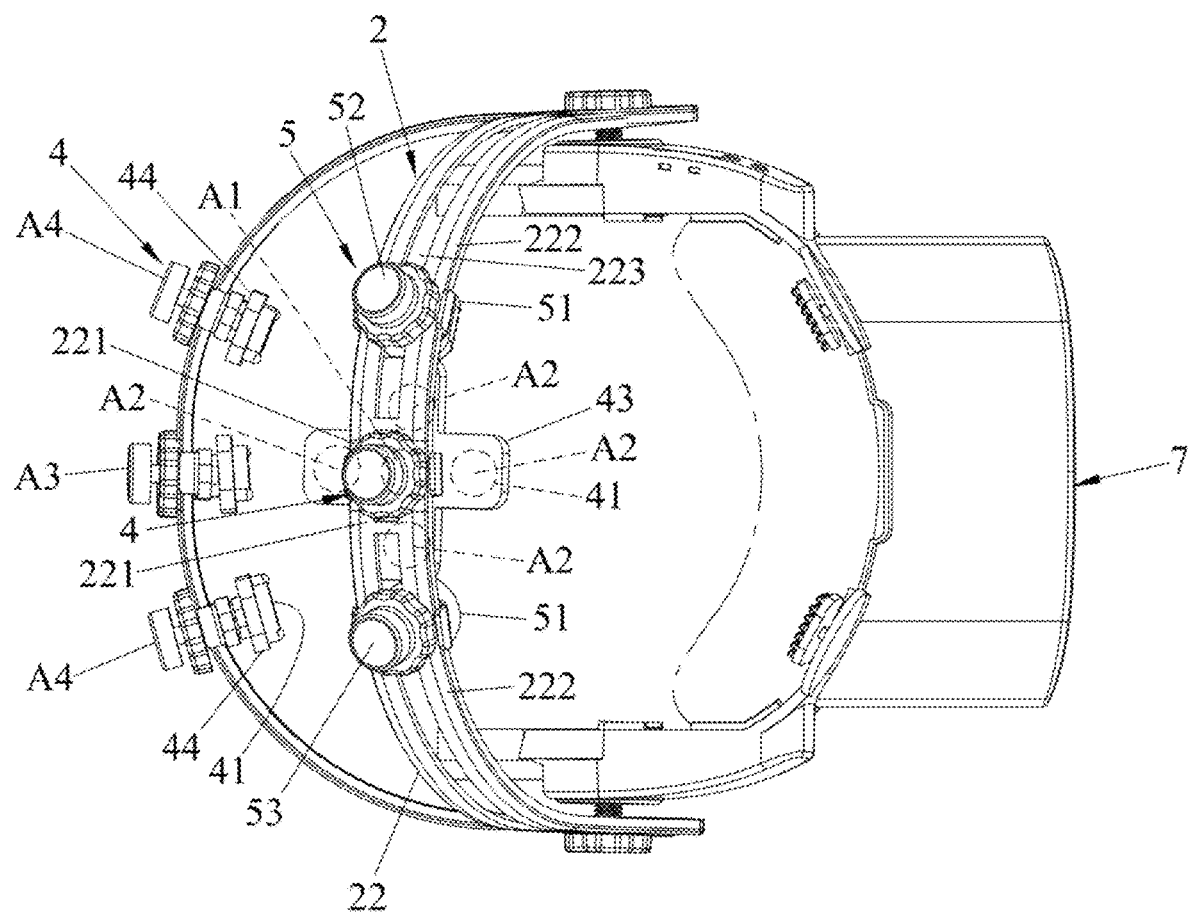
FIG. 4 is a plan view of the support unit, the audio stimulation unit, the acupoint stimulation unit, the electronic stimulation unit and the display and optical frequency-flashed stimulation unit of the first embodiment.
Figure 5:
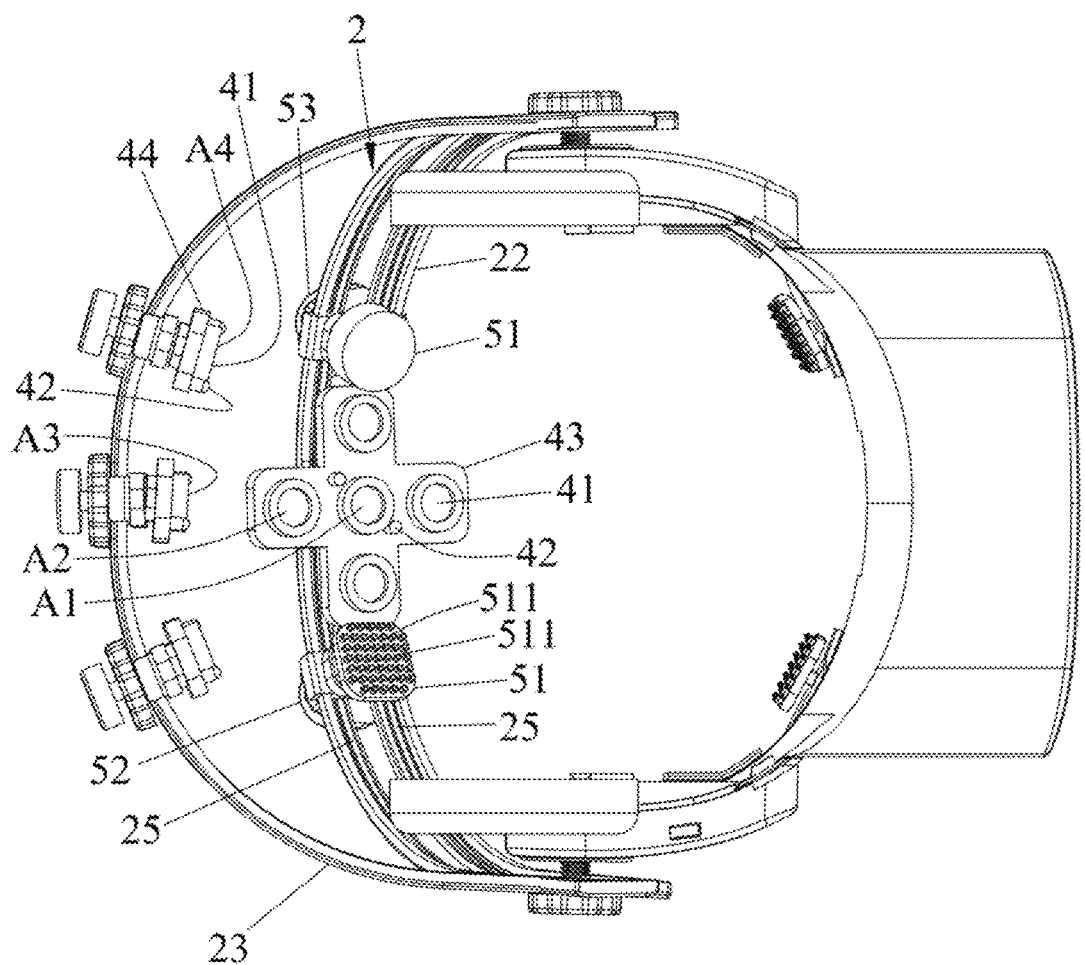
FIG. 5 is a bottom view of the support unit, the audio stimulation unit, the acupoint stimulation unit, the electronic stimulation unit and the display and optical frequency-flashed stimulation unit of the first embodiment.

Referring to FIGS. 2, 4 and 5, the support unit 2 corresponds to the head shape of the user, and includes two ears portions 21 corresponding to both ears of the user, a top-side portion 22 rotatably connected between the ears portions 21 and spanning upwardly over the top of the user's head, a back-side portion 23 rotatably connected between the ears portions 21 and spanning backwardly over the back of the user's skull, and a front-side portion 24 connected between the ears portions 21 and spanning forwardly over the user's eyes.

Figure 6:
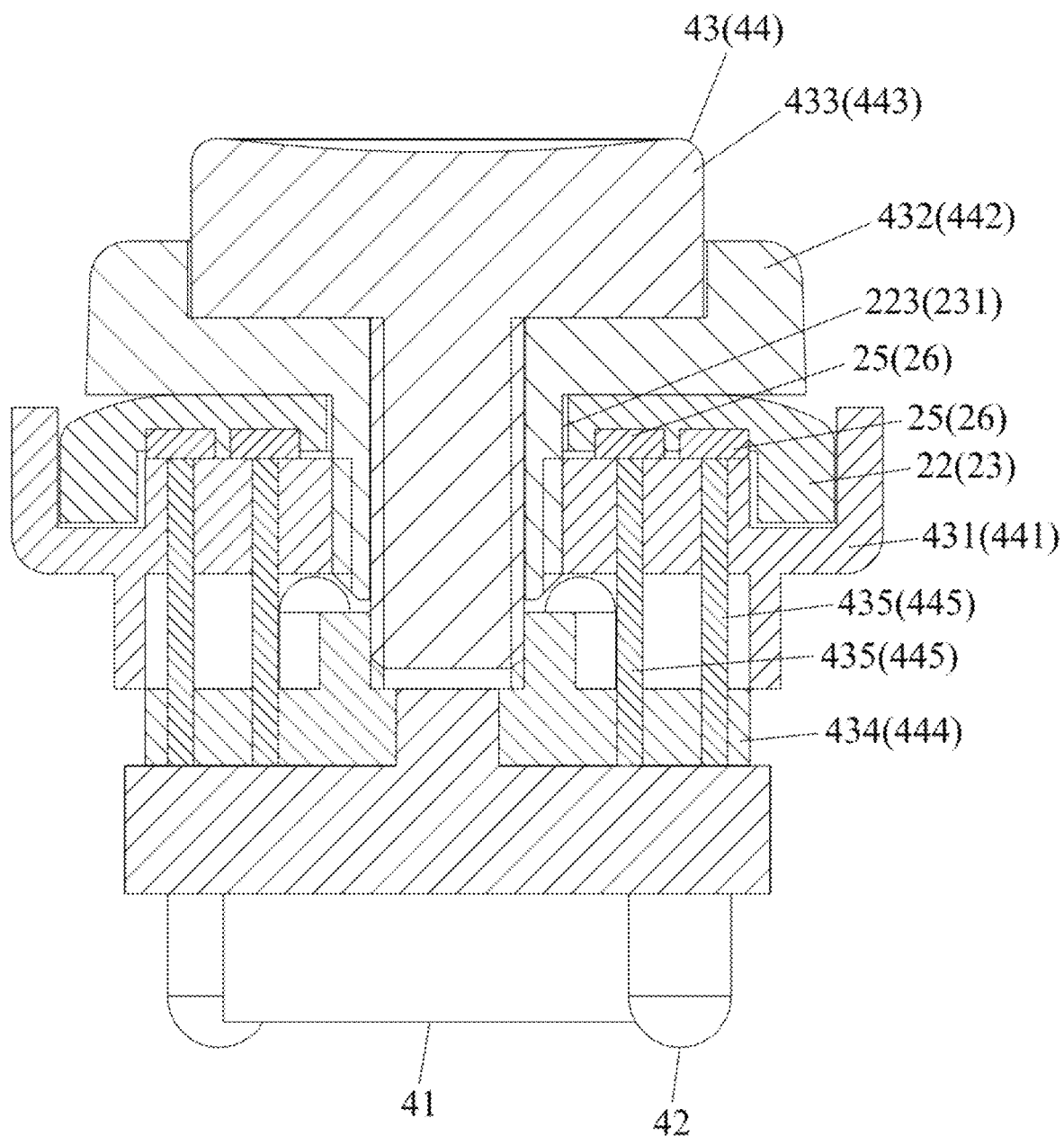
FIG. 6 is a partial schematic diagram of the acupoint stimulation unit of the first embodiment.
Figure 7:
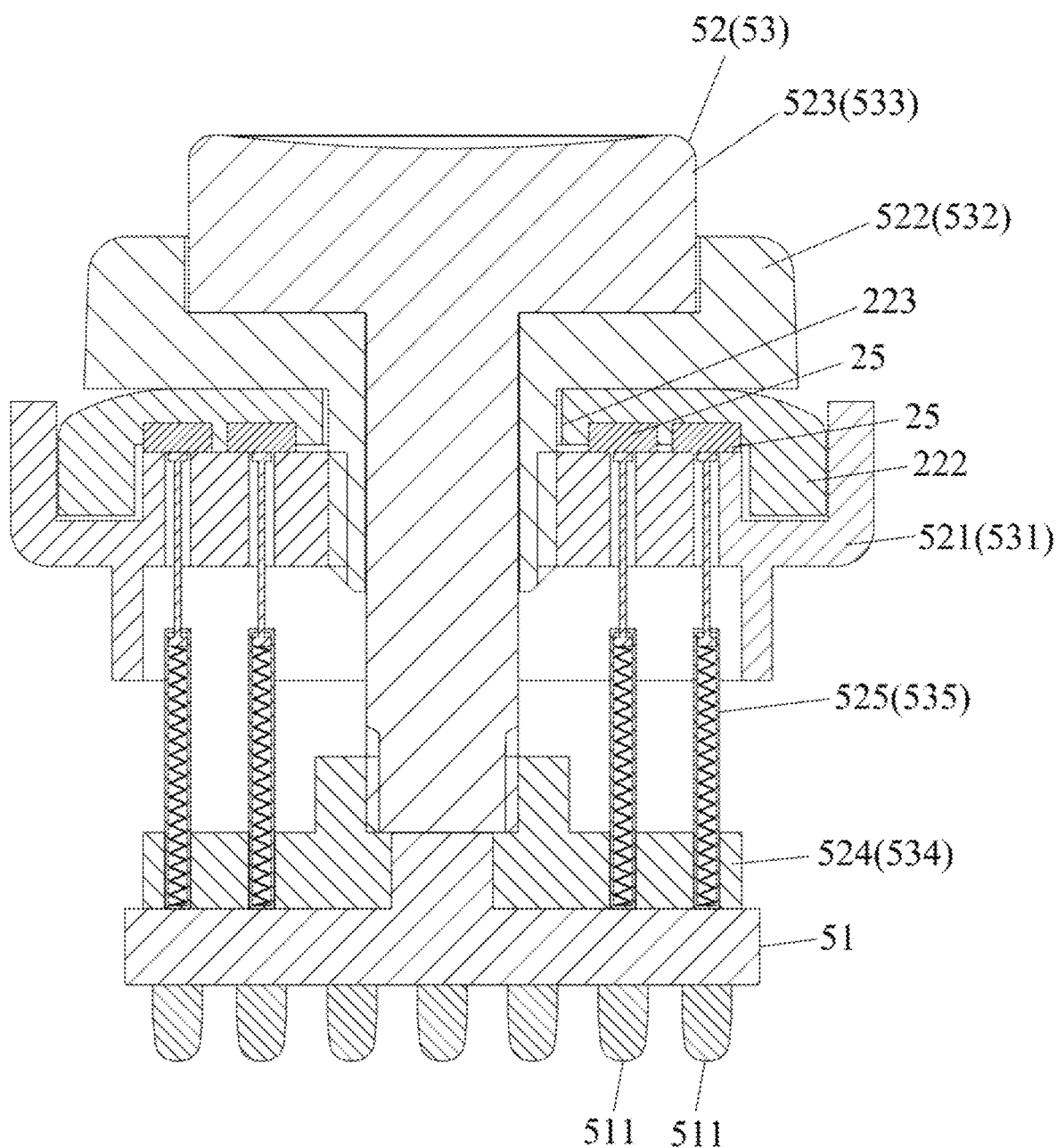
FIG. 7 is a cross-sectional schematic diagram of the electronic stimulation unit of the first embodiment.

Referring to FIGS. 5, 6 and 7, the support unit 2 further includes the first conductive strips 25 disposed at the bottom of the top-side portion 22, and a plurality of the second conductive strips 26 disposed at the front side of the back-side portion 23. In this embodiment, the first conductive strips 25 and the second conductive strips 26 are used to provide power.

Referring to FIGS. 2, 3 and 4, the top-side portion 22 has a top area 221 located at the center between the ears portions 21, two side areas 222 connected between the ears portions 21 and the top area 221, and a first mounting slot 223, and a second mounting slot 231 in the back-side portion 23. In this embodiment, the first mounting slot 223 and the second mounting slot 231 are adjacent to each other at intervals of three slots, but can be a single slot to achieve the same function.

The audio stimulation unit 3 includes two speakers 31 respectively arranged at the ears portions 21, and the speakers 31 are used to broadcast a binaural beats with frequency following response to both ears of the user, and the binaural beats with frequency following response has an audio frequency difference. In this embodiment, the audio frequency difference of the binaural beats with frequency following response is between 16 Hz and 19 Hz.

Referring to FIGS. 4, 5, and 6, the acupoint stimulation unit 4 includes several acupoint agent 41 that can be positioned at the support unit 2 in a position-adjustable manner, several resistance measuring agents 42 electrically connected to the control unit 8 (see FIG. 1) and adjacent to the acupoint agent 41, a first setting base 43, and three second setting bases 44.

These acupoint agent 41 are used to output physical stimulation of irradiating light to the user's head acupoints, and each resistance measurement agent 42 is used to measure the body resistance of the user to confirm whether the corresponding acupoint agent 41 is located at a low acupoint area of resistance. In this embodiment, the irradiation light of the acupoint agent 41 is laser light with a light wavelength ranging from 500 nm to 900 nm and an output power ranging from 100 mW to 200 mW. In other embodiments, the irradiation light can also be near-infrared light.

Referring to FIGS. 2, 3, and 4, one of these acupoint agents 41 can be positioned at the center of the top area 221 to correspond to the user's Baihui acupoint (international acupoint code GV20). Indicated by the number A1.

Four of these acupoint agents 41 can be positioned at a distance of a finger distance from the center of the top area 221 to correspond to the user's four Sishen Cong acupoints (international acupoint code EX-HN1), represented by the number A2 in the diagram. In this embodiment, the finger distance is substantially 2.3 cm.

One of the acupoint agents 41 is arranged on the back-side portion 23 in a position-adjustable manner, relatively located at the center between the ears portions 21, and seven times apart from the center of the top area 221, so as to correspond to the Fengfu acupoint (international acupoint code GV16) of the user, which is indicated by number A3 in the diagram.

Two of the acupoint agents 41 are arranged on the back-side portion 23 in a position-adjustable manner, seven times the finger distance backward of the center of the top area 221, and spaced apart from the ears portions 21 by 2.25 times the finger distance to respectively correspond to two Fengchi acupoints (international acupoint code GB20) of the user, which are indicated by the number A4 in the diagram.

It should be noted that the above-mentioned method of corresponding user's acupoints is to measure the resistance of human skin with the resistance measuring agent 42 near the acupoints, and take the lowest resistance position as the position of the acupoints, and then fine-tune the corresponding acupoint agents 41 to correspond to the corresponding position to complete the positioning of the acupoints.

Referring to FIGS. 4, 5 and 6, The first setting base 43 has a first sliding member 431 disposed below the top area 221 and the first conductive strips 25, a first screw locking member 432 that passes through the first mounting slot 223 from the side opposite to the top area 221 and is screwed to the first sliding member 431 to fix the first sliding member 431, a first positioning member 433 passing through the first sliding member 432 from the side opposite to the first sliding member 431, a first mounting platform 434 arranged on the side opposite to the top area 221 of the first sliding member 431 and screwed to the first positioning member 433, and a plurality of the first conductive members 435 passing through the first sliding member 431 and the first mounting platform 434 and connecting the first conductive strips 25, respectively. In this embodiment, the first setting platform 434 is cross-shaped, and five acupoints numbered A1 and A2 are arranged on the first mounting platform 434.

Each second setting base 44 has a second sliding member 441 arranged in front of the back-side portion 23 and the second conductive strips 26, a second screw locking member 442 passing through the second mounting slot 231 from the side opposite to the back-side portion 23 and screwed to the second sliding member 441 for fixing the second sliding member 441, a second positioning member 443 passing through the second screw locking member 442 from the side opposite to the second sliding member 441, a second mounting platform 444 arranged on the side opposite to the back-side portion 23 of the second sliding member 441 and screwed to the second positioning member 443, and a plurality of the second conductive members 445 passing through the second sliding member 441 and the second mounting platform 444 and connecting the second conductive strips 26, respectively. In this embodiment, three acupoints numbered A3 and A4 are respectively arranged on the second mounting platforms 444.

Referring to FIGS. 4, 5, and 7, the electronic stimulation unit 5 includes two electronic stimulation agents 51, a third setting base 52, and a fourth setting base 53, which are arranged on the support unit 2 and used to output physical stimulation to the user's head.

The electronic stimulation agents 51 are respectively arranged in the lateral areas 222 to correspond to the C3 position and C4 position in the international 10-20 system electroencephalogram electrode positions. It should be noted that the physical stimulation is direct current for transcranial direct current stimulation (tDCS), and the current is between 1 mA and 2 mA, but it is not limited to this, and it can also be electromagnetic pulse for transcranial magnetic stimulation (TMS), and the electromagnetic frequency is 1 Hz. In this embodiment, one of the electronic stimulation agents 51 is an output current type, which is installed in the third setting base 52, and the other is an output magnetic force type, which is installed in the fourth setting base 53. The electronic stimulation agents 51 of the output current type has several conductive pillars 511 arranged in parallel to output physical stimulation, and is made of silicone electrode material, and outputs current to the user's head through the conductive pillars 511 for transcranial electrical stimulation, the electrical stimulation agents 51 in the form of output magnetic force is an element known to those skilled in the field, and therefore will not be further described.

The third setting base 52 has a third sliding member 521 disposed under one of the side areas 222 and the first conductive strips 25, a third screw locking member 522 that passes through the first mounting slot 223 from the side opposite to the top-side portion 22 and is screwed to the third sliding member 521 for fixing the third sliding member 521, a third positioning member 523 slidably passing through the third sliding member 521 from the side opposite to the third screw locking member 522, a third mounting platform 524 arranged on the side opposite to the top-side portion 22 of the third sliding member 521 and screwed to the third positioning member 523, and a plurality of the third mounting platforms telescopically passing through the third sliding member 521 and the third mounting platform 524 and connecting the first conductive strips 25 respectively. One of the electronic stimulation agents 51 is disposed on the side of the third mounting platform 524 opposite to the top-side portion 22 and electrically connected to the third conductive members 525. In this embodiment, the electronic stimulation agents 51 with an output current type is arranged on the third mounting platform 524.

The fourth setting base 53 has a fourth sliding member 531 disposed under the other of the side areas 222 and the first conductive strips 25, a fourth screw locking member 532 passing through the second mounting slot 223 from the side opposite to the top-side portion 22 and screwed to the fourth sliding member 531 for fixing the fourth sliding member 531, a fourth positioning member 533 slidably passing through the fourth sliding member 531 from the side opposite to the fourth screw locking member 532, a fourth mounting platform 534 arranged on the side opposite to the top-side portion 22 of the fourth sliding member 531 and screwed to the fourth positioning member 533, and a plurality of the fourth mounting platforms telescopically passing through the fourth sliding member 531 and the fourth mounting platform 534 and connecting the first conductive strips 25 respectively. The other of the electronic stimulation agents 51 is disposed on the side of the fourth mounting platform 534 opposite to the top-side portion 22 and electrically connected to the fourth conductive members 535. In this embodiment, the electronic stimulation agents 51 which outputs magnetic force is arranged on the fourth mounting platform.

Referring to FIGS. 1, 2 and 4, the training unit 6 can sense its own motion to output a measurement signal. The training unit 6 includes a pressure plate 61 electrically connected to the control unit 8 and outputting the measurement signal corresponding to the pressure condition.

The display and optical frequency-flashed stimulation unit 7 is installed at the front-side portion 24 of the support unit 2 and can be switched between a display mode and an optical frequency-flashed stimulation mode. In the display mode, the display and optical frequency-flashed stimulation unit 7 is used to display a virtual image 71 for the user's eyes to see and a feedback sign 72 corresponding to the pressure condition of the pressure plate 61. In the optical frequency-flashed stimulation mode, the display and optical frequency-flashed stimulation unit 7 is used to display a flickering picture. In this embodiment, the virtual image 71 is a VR image, and the feedback sign 72 is the pressure value of the pressure plate 61.

When the display and optical frequency-flashed stimulation unit 7 is in the optical frequency-flashed stimulation mode, the flickering picture displayed by the display and optical frequency-flashed stimulation unit 7 flickers at a predetermined optical ranging from 30 Hz to 60 Hz. In other embodiments, when the display and optical frequency-flashed stimulation unit 7 is in the optical frequency-flashed stimulation mode, the flickering picture displayed by the display and optical frequency-flashed stimulation unit 7 respectively stimulates both of the user's eyes with an optical frequency-flashed difference.

The control unit 8 is electrically connected to the speakers 31, the acupoint agents 41, the electronic stimulation agents 51, the training unit 6 and the display and optical frequency-flashed stimulation unit 7, and stores the digital information of the binaural beats with frequency following response and the virtual image 71, and can simultaneously control the speakers 31 to broadcast the binaural beats with frequency following response, the acupoint agent 41 to emit physical stimulation and the electronic stimulation agents 51 to emit physical stimulation according to a preset command, and controls the display and optical frequency-flashed stimulation unit 7 to switch between the display mode and the optical frequency-flashed stimulation mode, and can receive and change the virtual image 71 according to the measurement signal in the display mode. In this embodiment, the control unit 8 is a personal computer, and can simultaneously display the virtual image 71 and the feedback sign 72 of the display and optical frequency-flashed stimulation unit 7 on a screen 81. In this embodiment, the digital information, the virtual image 71, and the display information related to the preset command are downloaded through the cloud network and then pre-stored in the control unit 8.

The following is an example in which the user is a stroke patient. The user first wears the multi-stimulation neurorehabilitation assistant system, and then the control unit 8 will control the display and optical frequency-flashed stimulation unit 7 in the display mode, a virtual image 71 such as a landscape and the feedback sign 72 are displayed, and at the same time, the control unit 8 will control the speakers 31 to broadcast the binaural beats with frequency following response, and make the acupoint agents 41 emit physical stimulations to the corresponding acupoints, and the electronic stimulation agents 51 emit physical stimulation to the corresponding brain areas, and then the user performs the action of wiping the pressure plate 61, and then trains the lateral movements of the hand. When the control unit 8 receives the measurement signal generated by the pressure plate 61, the relevant signal data will be stored in the cloud network, and at the same time in the display mode, the virtual image 71 and the feedback sign 72 will be controlled to generate corresponding positions. As shown in FIG. 1, the virtual image 71 is changed from a landscape image to a vehicle image at the corresponding pressure point, and the feedback sign 72 displays the pressure value of the pressure plate 61.

When the user is in the rehabilitation, the change of the virtual image 71 will make the user feel interesting, and the feedback sign 72 can also feedback the real-time operation status, so the user's willingness to use can be greatly improved. The user can also maintain the freshness by changing the virtual image 71, so that the user can be willing to practice, thus avoiding the disadvantage that the existing rehabilitation method is easy to lose patience and no longer perform rehabilitation. Therapists can also perform data analysis through the relevant signal data stored in the cloud network.

It should be added that the experimental results on the effects of the physical stimulation of the acupoint agents 41 and the electronic stimulation agents 51 on stroke patients in this case have been proved by the following references, so no further explanation will be given in this specification.

1. Hao, J. J. and L. L. Hao (2012). "Review of clinical applications of scalp acupuncture for paralysis: an excerpt from chinese scalp acupuncture." Glob Adv Health Med 1(1): 102-121.
2. Dall'Agnol, M. S. and F. Cechetti (2018). "Kinesio Taping Associated with Acupuncture in the Treatment of the Paretic Upper Limb After Stroke." J Acupunct Meridian Stud 11(2): 67-73.
3. Elsner, B., G. Kwakkel, J. Kugler and J. Mehrholz (2017). "Transcranial direct current stimulation (tDCS) for improving capacity in activities and arm function after stroke: a network meta-analysis of randomised controlled trials." J Neuroeng Rehabil 14.
4. Chhatbar, P. Y., V. Ramakrishnan, S. Kautz, M. S. George, R. J. Adams and W. Feng (2016). "Transcranial Direct Current Stimulation Post-Stroke Upper Extremity Motor Recovery Studies Exhibit a Dose-Response Relationship." Brain Stimul 9(1): 16-26.
5. Maria Antonia Fuentes, A. B., Jorge Latorre, Carolina Colomer, Mariano Alcañiz, and M. J. S.-L. E. N. R. Llorens (2018). "Combined Transcranial Direct Current Stimulation and Virtual Reality-Based Paradigm for Upper Limb Rehabilitation in Individuals with Restricted Movements. A Feasibility Study with a Chronic Stroke Survivor with Severe Hemiparesis." Journal of Medical Systems 42:87.
6. Yeun Joon Kim, J. K., Sangwoo Cho, Hyun Jung Kim, Yun Kyung Cho, Teo Lim, Youn Joo Kang (2014). "Facilitation of corticospinal excitability by virtual reality exercise following anodal transcranial direct current stimulation in healthy volunteers and subacute stroke subjects." Journal of NeuroEngineering and Rehabilitation.
7. Salatino, A., E. Berra, W. Troni, K. Sacco, F. Cauda, F. D'Agata, G. Geminiani, S. Duca, U. Dimanico and R. Ricci (2014). "Behavioral and neuroplastic effects of low-frequency rTMS of the unaffected hemisphere in a chronic stroke patient: a concomitant TMS and fMRI study." Neurocase 20(6): 615-626.
8. Ludemann-Podubecka, J., K. Bosl and D. A. Nowak (2015). "Repetitive transcranial magnetic stimulation for motor recovery of the upper limb after stroke." Prog Brain Res 218: 281-311.
9. Ward, N. S., M. M. Brown, A. J. Thompson and R. S. Frackowiak (2003). "Neural correlates of outcome after stroke: a cross-sectional fMRI study." Brain 126 (Pt 6): 1430-1448.
10. O'Brien, A. T., F. Bertolucci, G. Torrealba-Acosta, R. Huerta, F. Fregni and A. Thibaut (2018). "Non-invasive brain stimulation for fine motor improvement after stroke: a meta-analysis." Eur J Neurol 25(8): 1017-1026.

Figure 8:
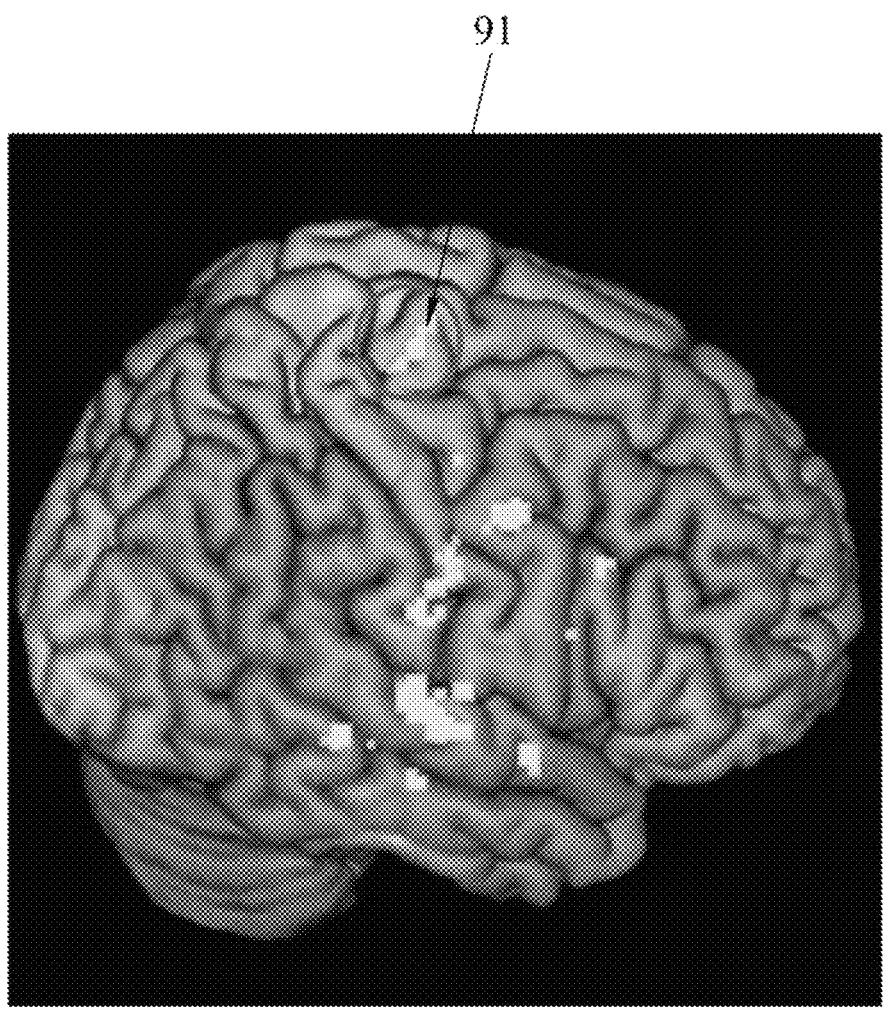
FIG. 8 is a magnetic resonance imaging of a subject listening to a binaural beats with frequency following response.

In addition, referring to FIGS. 1 and 8, by taking a magnetic resonance imaging (MRI) image of a subject while listening to the binaural beats with frequency following response with an audio frequency difference of 16-19 Hz, it can be seen that the MRI brain positioning coordinates (52,0,46) (i.e., the yellow activation area 91 in the red circle in the figure) are activated, since this location corresponds to the motor area of the human brain, it is sufficient to prove that listening to the binaural beats with frequency following response within the range of the audio frequency difference can affect the motor area of the human brain.

Figure 9:
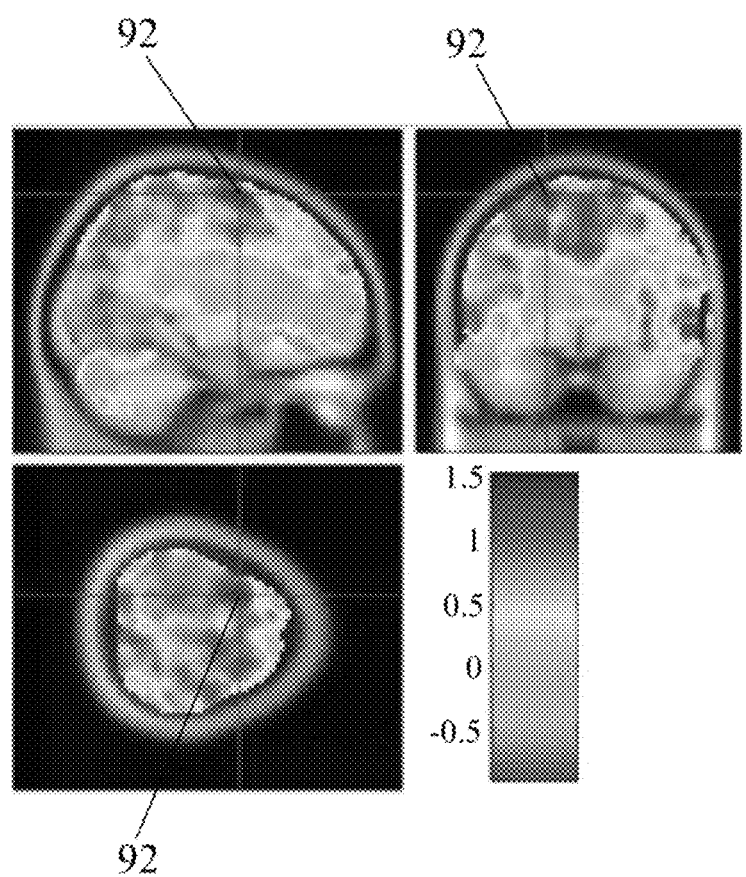
FIG. 9 is a magnetic resonance imaging of a subject after being stimulated by a predetermined optical flash frequency of 40 Hz.
Figure 10:
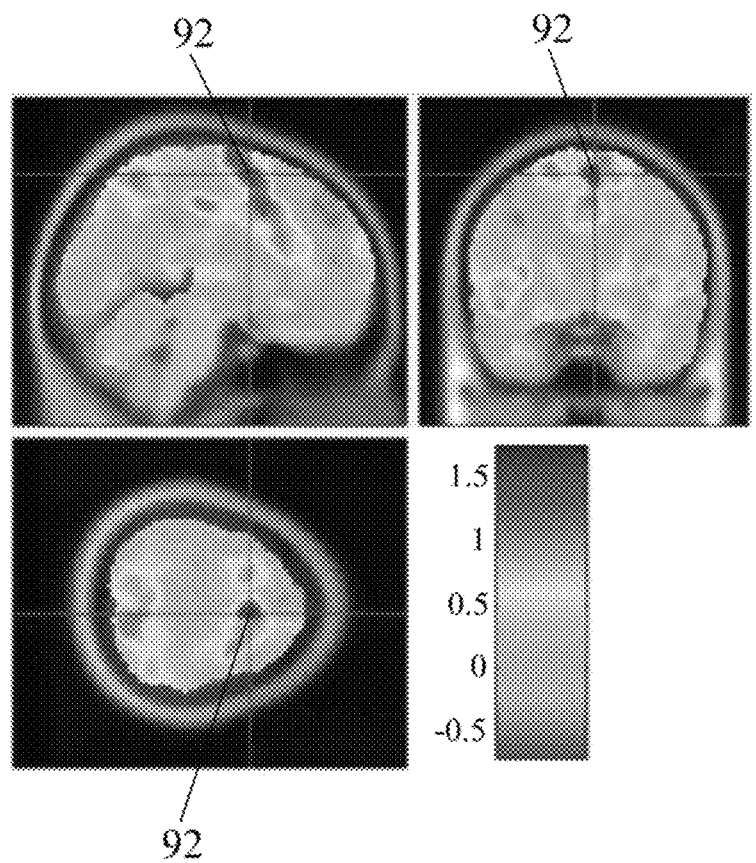
FIG. 10 is a magnetic resonance imaging of a subject after being stimulated by a predetermined optical flash frequency of 50 Hz.

Referring to FIGS. 1, 9, and 10, according to the experimental verification done by the inventor, when the control unit 8 controls the display and optical frequency-flashed stimulation unit 7 to be in the optical frequency-flashed stimulation mode, a flickering picture is displayed, so that after the optical stimulation with the predetermined flash frequency of 40 Hz and 50 Hz is performed on another subject, a magnetic resonance imaging (MRI) image is taken on the subject. It can be seen that the MRI brain localization coordinates (−18,0,72) stimulated by 40 Hz light frequency (i.e., the blue cross 92 in FIG. 9) and the MRI brain localization coordinates (6,4,66) stimulated by 50 Hz light frequency (i.e., the blue cross 93 in FIG. 10) are activated, Since these two locations are corresponding to the motor areas of the human brain, it is sufficient to prove that the optical stimulation within the predetermined flash frequency range can affect the motor areas of the human brain.

From the above description, it can be known that the binaural beats with frequency following response, the acupoints, the optical stimulation and the stimulation of the brain regions can increase the activation of the affected brain or reduce the activation of the contralateral brain. The invention further uses the binaural beats with frequency following response, the acupoints, the optical stimulation, the stimulation of the brain regions and repeated motor trainings at the same time, so that the user can simultaneously obtain multiple stimulation. The effect of rehabilitation can be greatly increased when matched with the virtual image 71 and the feedback sign 72.

Figure 11:
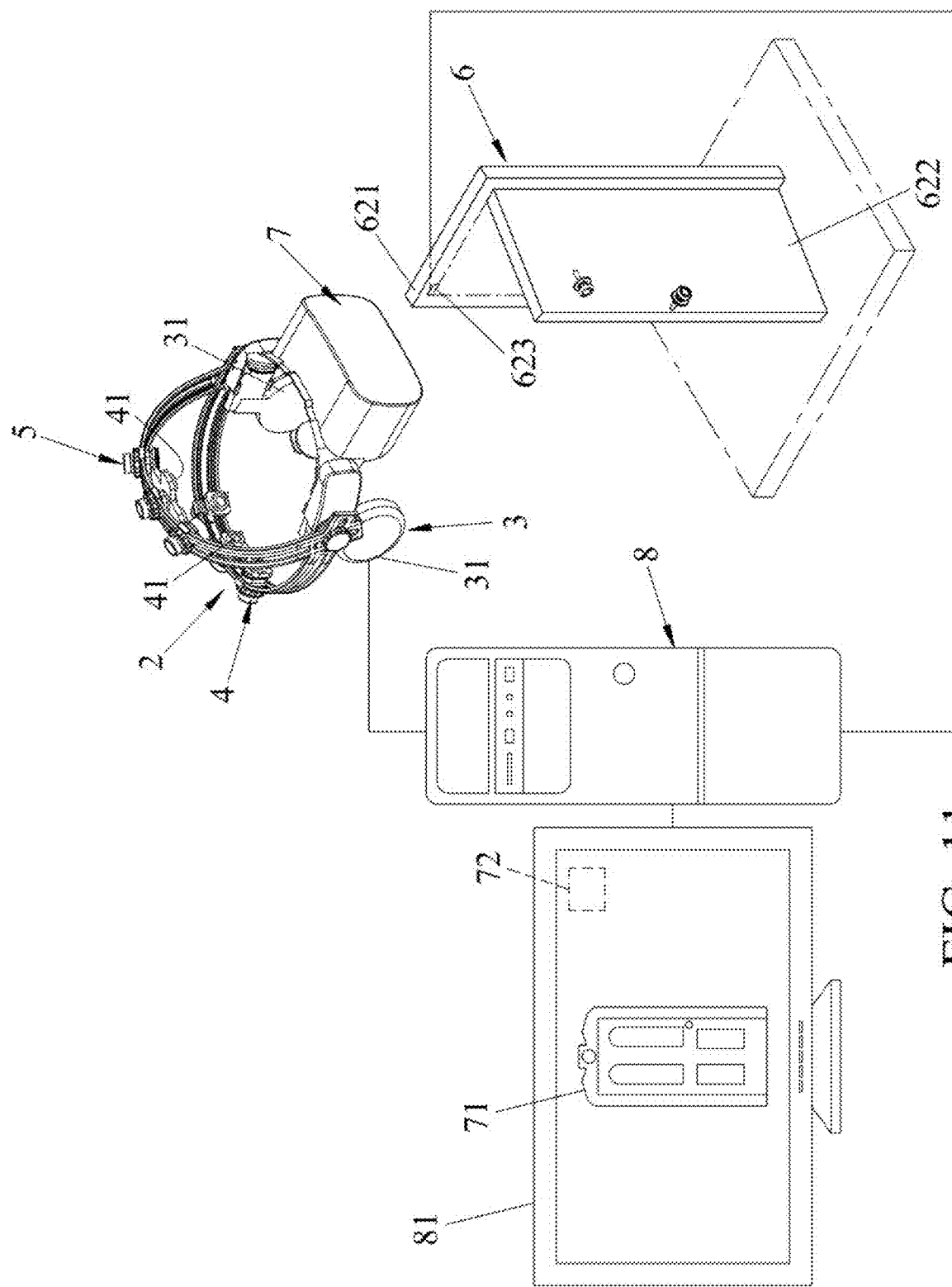
FIG. 11 is a schematic diagram of the second embodiment of the multi-stimulation neurorehabilitation assistant system of the present invention.

Referring to FIG. 11, a second embodiment of the present invention is similar to the first embodiment, with the differences that:

The training unit 6 includes a door frame 621, a door panel 622 pivotally connected to the door frame 621, and a door trigger switch 623 disposed in one of the door frame 621 and the door panel 622 and electrically connected to the control unit 8 to output the measurement signal corresponding to whether the door panel 622 is closed relative to the door frame 621.

When in use, the control unit 8 will control the display and optical frequency-flashed stimulation unit 7 to display the virtual image 71 of the door and the feedback sign 72 in the display mode, and then the user will push the door panel 622 to close the door panel 622 relative to the door frame 621, thus training the hand to push forward. When the control unit 8 receives the measurement signal generated by the door trigger switch 623 when the door panel 622 is closed, it will store the relevant signal data to the cloud network, and control the door in the virtual image 71 to close. The feedback sign 72 is corresponding to the pushed condition of the door panel 622, and the display content is the characters of two conditions: open door and closed door. When the door panel 622 changes from open to closed, the characters of the feedback sign change from open door to closed door.

In this way, the second embodiment can also achieve the same purpose and efficacy as the above-mentioned first embodiment.

Figure 12:
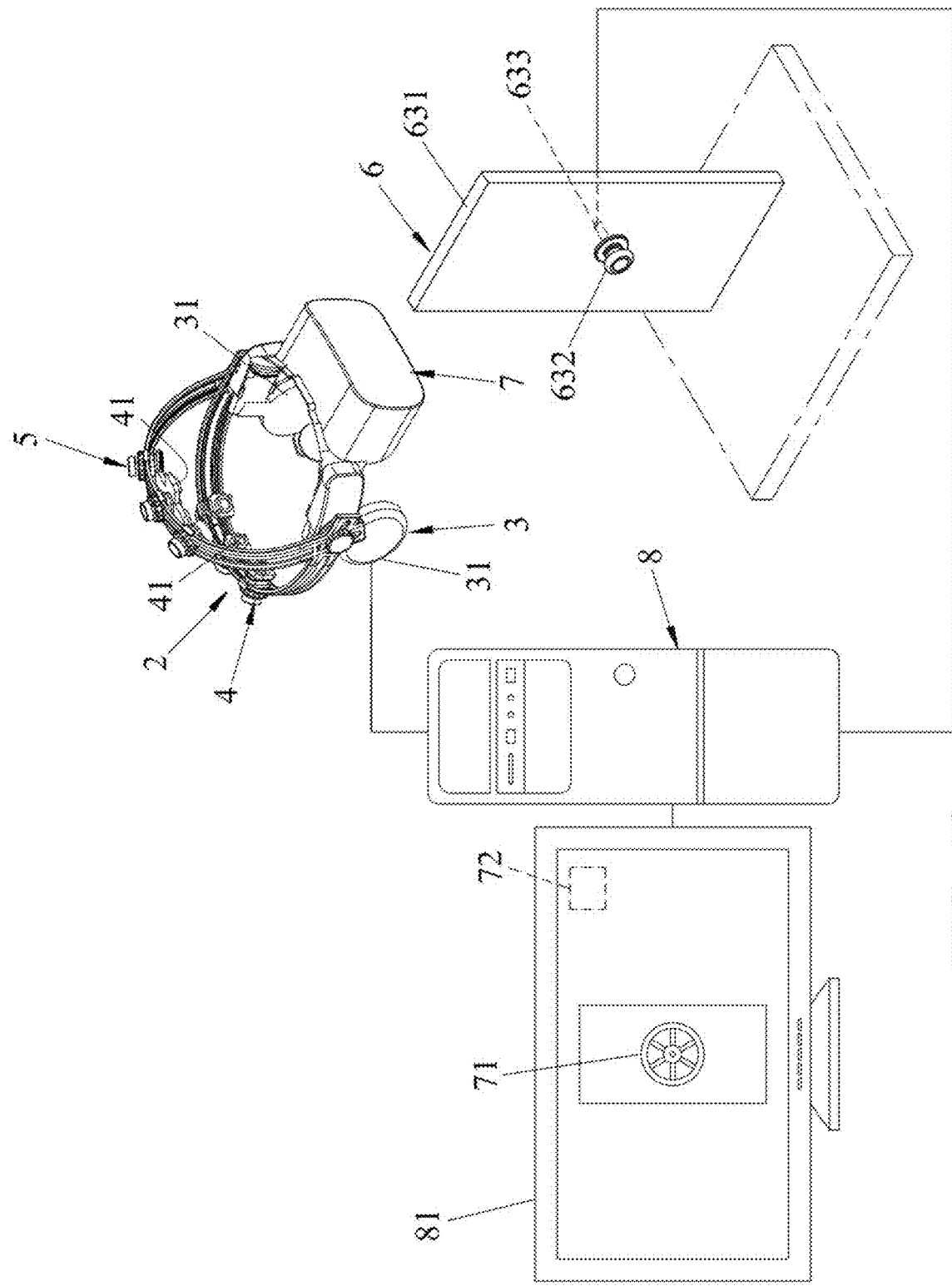
FIG. 12 is a schematic diagram of the third embodiment of the multi-stimulation neurorehabilitation assistant system of the present invention.

Referring to FIG. 12, a third embodiment of the present invention is similar to the first embodiment, with the differences that:

The training unit 6 includes a vertical plate 631, a door knob 632 rotatably disposed on the vertical plate 631, and an angle sensor 633 disposed on the door knob 632 and electrically connected to the control unit 8 to output the measurement signal corresponding to the rotation angle of the door knob 632.

When in use, the control unit 8 will control the display and optical frequency-flashed stimulation unit 7 to display the virtual image 71 of the safe and the door handle and the feedback sign 72 in the display mode, and then the user will rotate the door knob 632 to train the hand rotation. When the control unit 8 receives the measurement signal generated by the angle sensor 633 when the door knob 632 rotates, it will control the door handle of the safe in the virtual image 71. The feedback sign 72 is corresponding to the rotation angle of the door knob 632, and the display is the rotation angle of the door knob 632.

In this way, the third embodiment can also achieve the same purpose and efficacy as the above-mentioned first embodiment.

Figure 13:
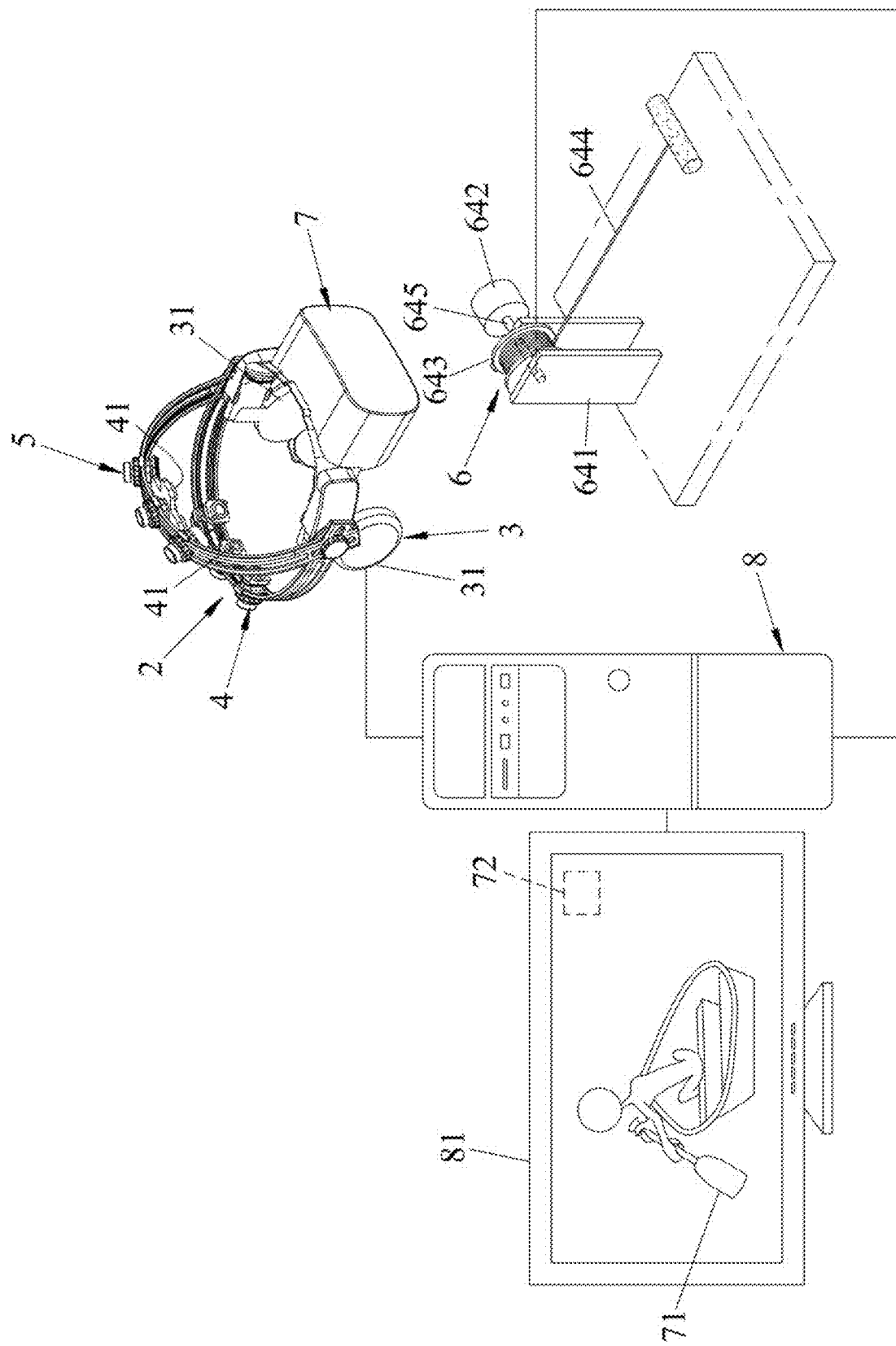
FIG. 13 is a schematic diagram of the fourth embodiment of the multi-stimulation neurorehabilitation assistant system of the present invention.

Referring to FIG. 13, a fourth embodiment of the present invention is similar to the first embodiment, with the differences that:

The training unit 6 includes a vertical frame 641, a motor 642, a rotatable wheel 643 arranged on the vertical frame 641 and controlled by the motor 642 to rotate towards tending to return to an initial position, a rope 644 connected to and wound around the rotatable wheel 643, and a torque sensor 645 arranged on the motor 642 and electrically connected to the control unit 8 to output the measurement signal corresponding to the driving torque of the motor 642.

When in use, the control unit 8 will control the display and optical frequency-flashed stimulation unit 7 to display the virtual image 71 and the feedback sign 72. For example, people operate the paddle in the display mode. When the user pull the rope 644 to train the hand pulling action, the control unit 8 receives the measurement signal generated by the torque sensor 645 in response to the rotation of the motor 642, it will control the people and paddle in the virtual image 71 to change their actions.

It should be noted that, in this embodiment, the rope 644 is pulled by the user's hand, while in other variations, the rope 644 can also be designed to be pulled by the user's foot, so as to be used for foot rehabilitation.

In this way, the fourth embodiment can also achieve the same purpose and efficacy as the above-mentioned first embodiment.

Figure 14:
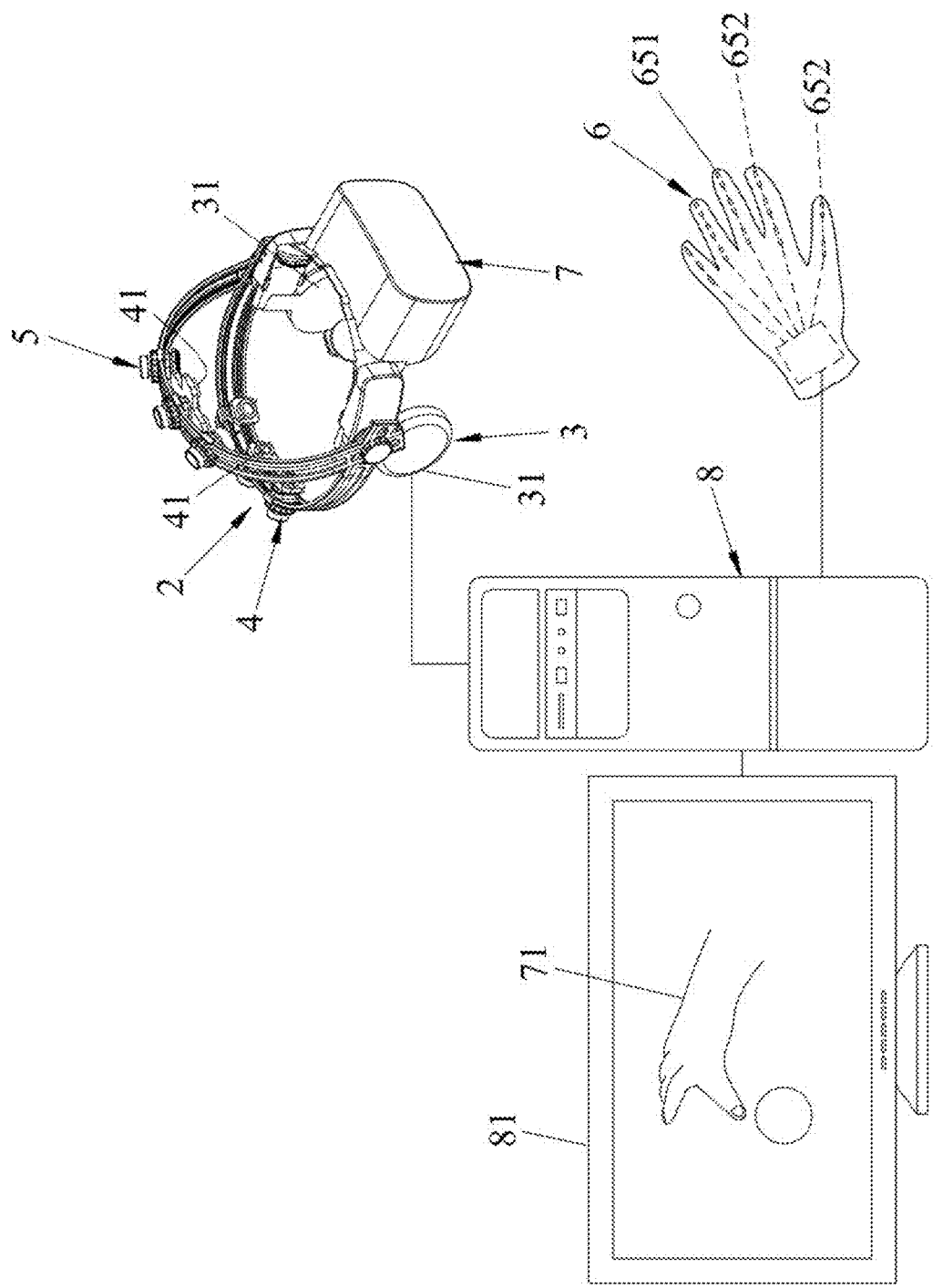
FIG. 14 is a schematic diagram of the fifth embodiment of the multi-stimulation neurorehabilitation assistant system of the present invention.

Referring to FIG. 14, a fifth embodiment of the present invention is similar to the first embodiment, with the differences that:

The training unit 6 includes a glove kit 651 for the user's hand to wear, and several hand sensors 652 disposed on the glove kit 651 and electrically connected to the control unit 8 to output the measurement signal corresponding to the action of the glove kit 651.

When in use, the control unit 8 will control the display and optical frequency-flashed stimulation unit 7 to display the virtual image 71 of a person's hand when holding a ball in the display mode, and then the user will open his hand to open the glove kit 651 correspondingly, so as to train his fingers' movements. When the control unit 8 receives the measurement signal generated by the opening of the hand sensors 652, it will control the hand of the person in the virtual image 71 to open and drop the ball.

In this way, the fifth embodiment can also achieve the same purpose and efficacy as the above-mentioned first embodiment.

Figure 15:
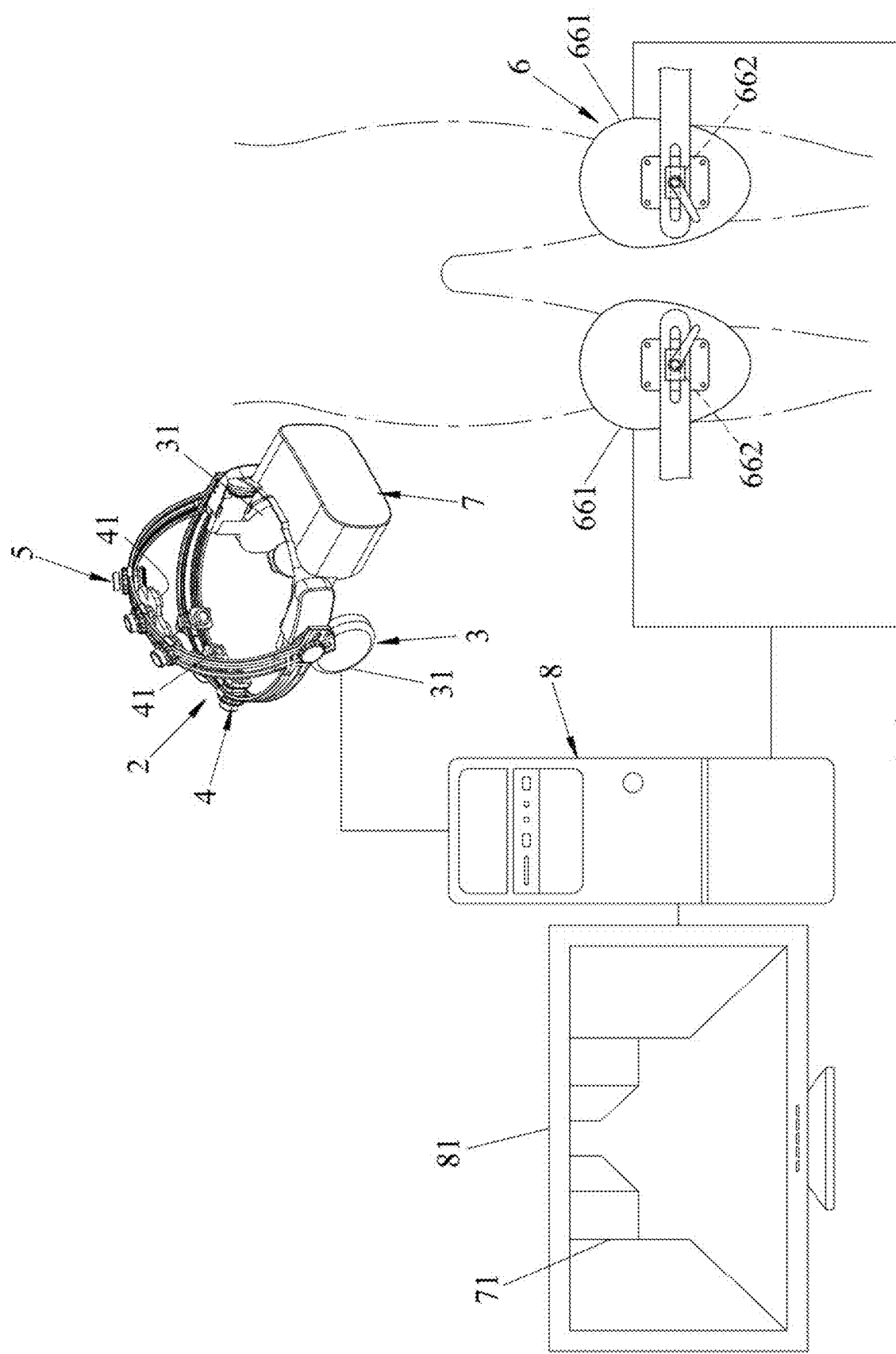
FIG. 15 is a schematic diagram of the sixth embodiment of the multi-stimulation neurorehabilitation assistant system of the present invention.

Referring to FIG. 15, a sixth embodiment of the present invention is similar to the first embodiment, with the differences that:

The training unit 6 includes two foot cover kits 661 for the user's feet to wear, and two foot sensors 662 respectively arranged on the foot cover kits 661 and electrically connected to the control unit 8 to output the measurement signals corresponding to the movements of the foot cover kits 661.

When in use, the control unit 8 will control the display and optical frequency-flashed stimulation unit 7 to display the virtual image 71 in the display mode, and then the user will start walking. When the control unit 8 receives the measurement signal of the foot sensors 662 when they are walking, it will control the virtual image 71 to generate an image that is gradually enlarged to simulate the gradual forward movement of people.

In this way, the sixth embodiment can also achieve the same purpose and efficacy as the above-mentioned first embodiment.

Figure 16:
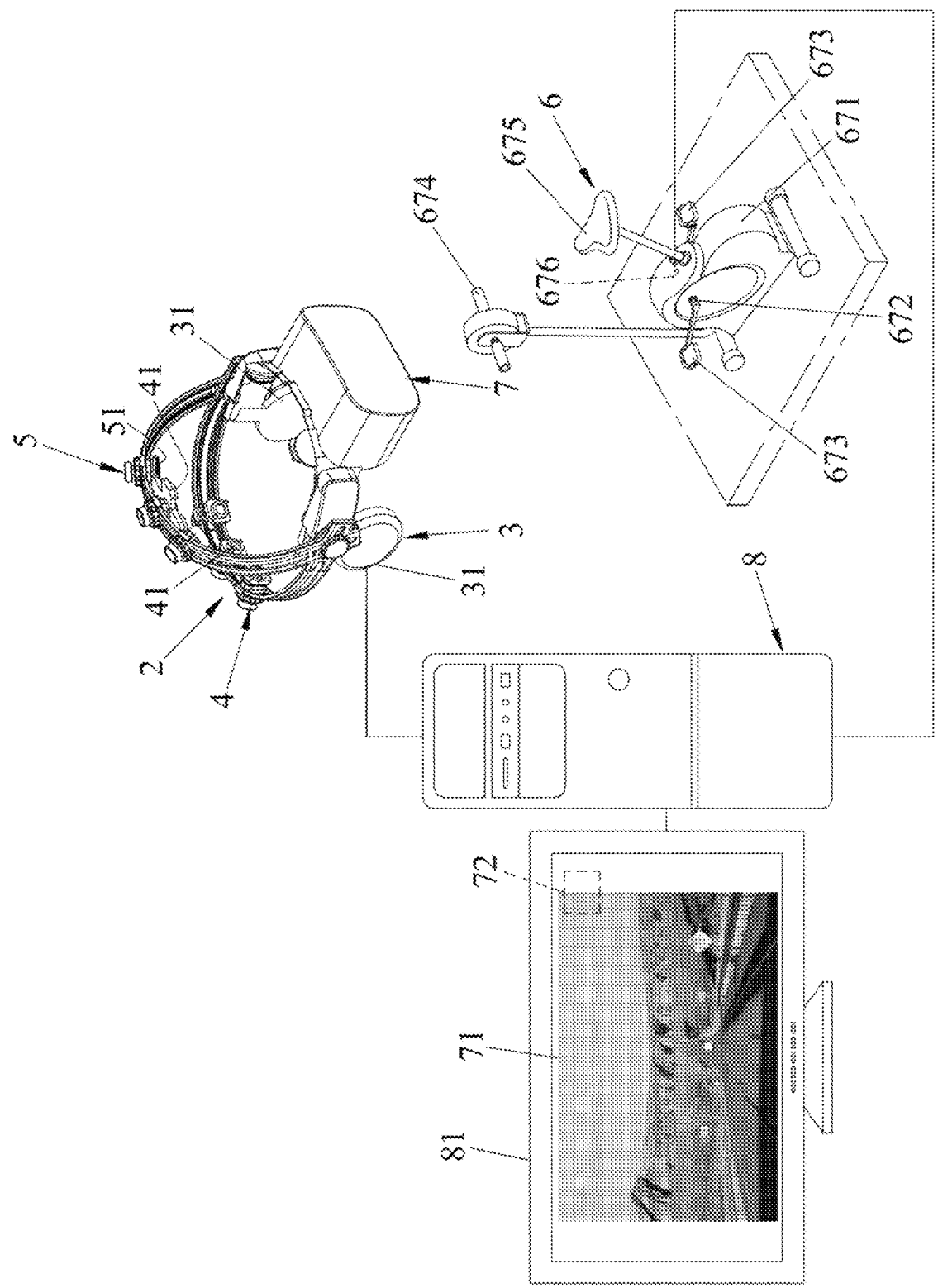
FIG. 16 is a schematic diagram of the seventh embodiment of the multi-stimulation neurorehabilitation assistant system of the present invention.

Referring to FIG. 16, a seventh embodiment of the present invention is similar to the first embodiment, with the differences that:

The training unit 6 includes a bicycle frame 671, a crank 672 rotatably disposed on the frame 671, two pedals 673 disposed on two opposite sides of the crank 672, a handle frame 674 and a seat 675 disposed on the bicycle frame 671, and a torque sensor 676 disposed on the crank 672 and electrically connected to the control unit 8 to output the measurement signal corresponding to the torque of the crank 672.

When in use, the user sits on the seat 675, holds the handle frame 674, and steps on the pedals 673. The control unit 8 controls the display and optical frequency-flashed stimulation unit 7 to display the virtual image 71 and the feedback sign 72 of the scene, such as when riding a bicycle, in the display mode. Then, the user steps on the pedals 673, so as to train the pedal action of feet. When the control unit 8 receives the measurement signal generated by the torque sensor 676 in response to the rotation of the crank 672, it controls the scene in the virtual image 71 to change to simulate the scene change when riding a bicycle. The feedback sign 72 corresponds to the rotation of the crank 672, and the display content is the rotation number of the crank 672 calculated by the measurement signal.

In this way, the seventh embodiment can also achieve the same purpose and efficacy as the above-mentioned first embodiment.

Figure 17:
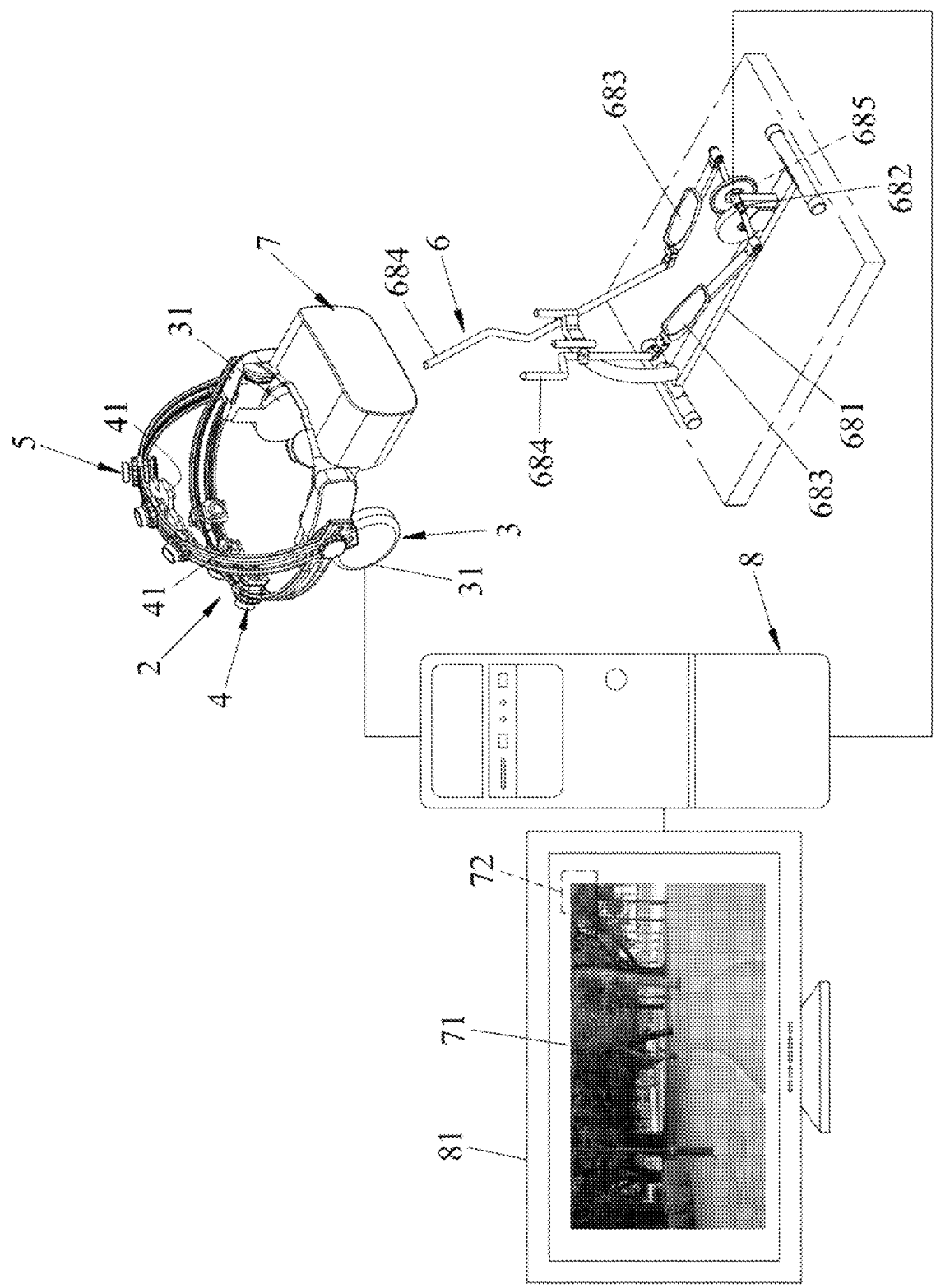
FIG. 17 is a schematic diagram of the eighth embodiment of the multi-stimulation neurorehabilitation assistant system of the present invention.

Referring to FIG. 17, an eighth embodiment of the present invention is similar to the first embodiment, with the differences that:

The training unit 6 includes a bicycle frame 681, a crank 682 rotatably mounted on the frame 681, two interlocking pedals 683 mounted on two opposite sides of the crank 682, two handles 684 respectively interlocked with the pedals 683, and a torque sensor 685 mounted on the crank 682 and electrically connected to the control unit 8 to output the measurement signal corresponding to the torque of the crank 682.

When in use, the user stands and steps on the pedals 683, holding the handles 684 with both hands, and the control unit 8 will control the display and optical frequency-flashed stimulation unit 7 to display the virtual image 71 and the feedback sign 72 of the scene, such as walking or running, in the display mode. Then, the user steps on the pedals 683 and moves with the handles 684, so as to train the whole body coordinated movement. When the control unit 8 receives the measurement signal generated by the torque sensor 685 in response to the rotation of the crank 682, it controls the scene in the virtual image 71 to change to simulate the scene change during walking or running. The feedback sign 72 corresponds to the rotation of the crank 682, and the display content is the number of rotations of the crank 682 calculated by the measurement signal.

In this way, the eighth embodiment can also achieve the same purpose and efficacy as the above-mentioned first embodiment.

Figure 18:
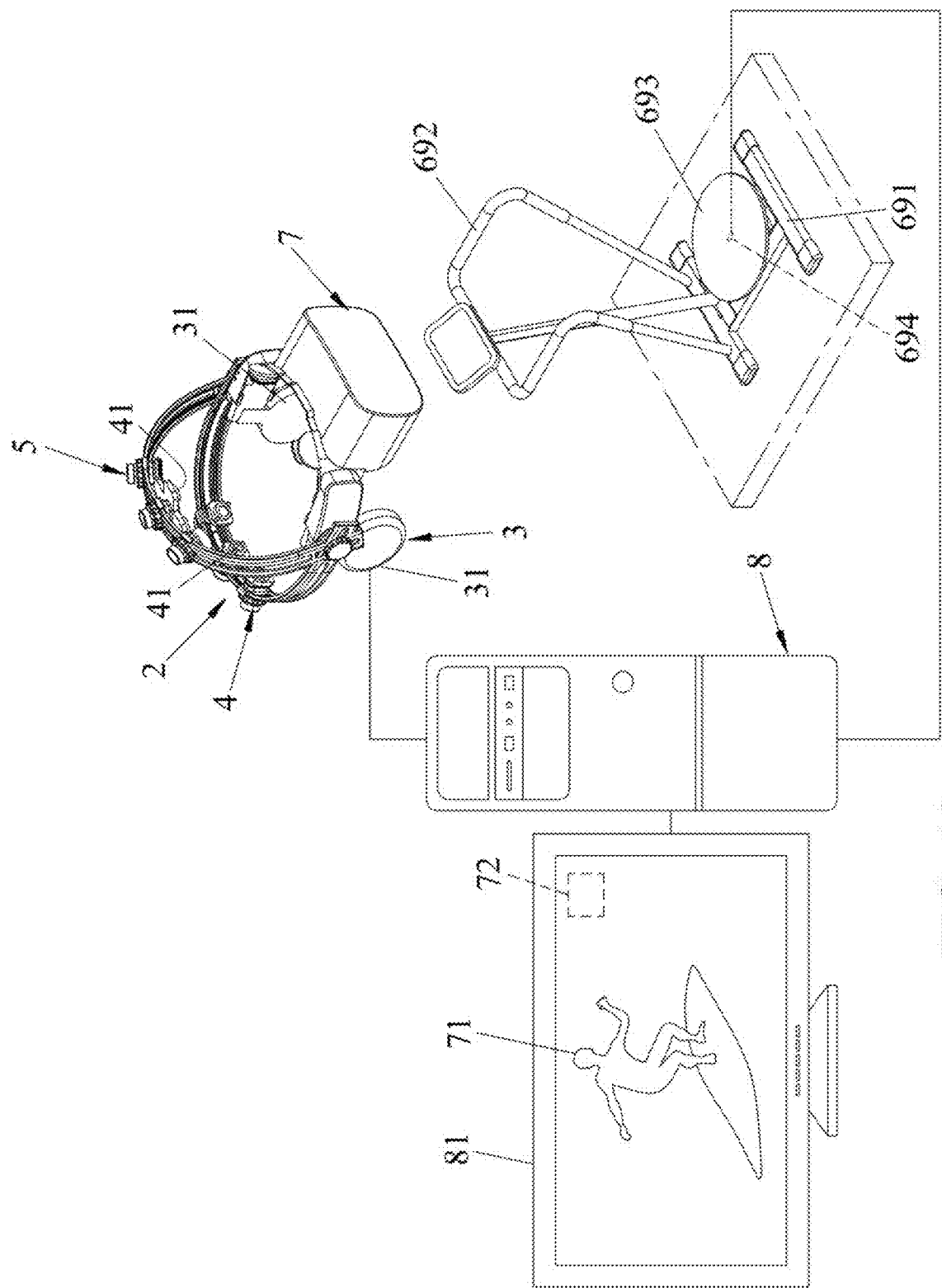
FIG. 18 is a schematic diagram of the ninth embodiment of the multi-stimulation neurorehabilitation assistant system of the present invention.

Referring to FIG. 18, a ninth embodiment of the present invention is similar to the first embodiment, with the differences that:

The training unit 6 includes a base 691, a support frame 692 extending upward from the base 691, a spring plate 693 disposed on the base 691 and behind the support frame 692 and capable of swinging relative to the base 691, and a yaw sensor 694 disposed at the bottom of the spring plate 693 and electrically connected to the control unit 8 to output a yaw angle corresponding to the spring plate 693.

When in use, the user stands on the spring plate 693 by holding the support frame 692. After keeping balance, the user can release the support frame 692 with both hands. At this time, the user's sense of balance can be trained. Once the balance is lost, the user can quickly hold the support frame 692 again with both hands without falling down. In the process of training the sense of balance, the control unit 8 will control the display and optical frequency-flashed stimulation unit 7 to display the surfing virtual image 71 and the feedback sign 72 in the display mode. When the control unit 8 receives the measurement signal generated by the yaw sensor 694 corresponding to the yaw angle of the spring plate 693, it will control the scene in the virtual image 71 to be changed to conform to the actual balance condition. The feedback sign 72 corresponds to the yaw condition of the spring plate 693, and the display content is the spring plate 693.

In this way, the ninth embodiment can also achieve the same purpose and efficacy as the above-mentioned first embodiment.

Figure 19:
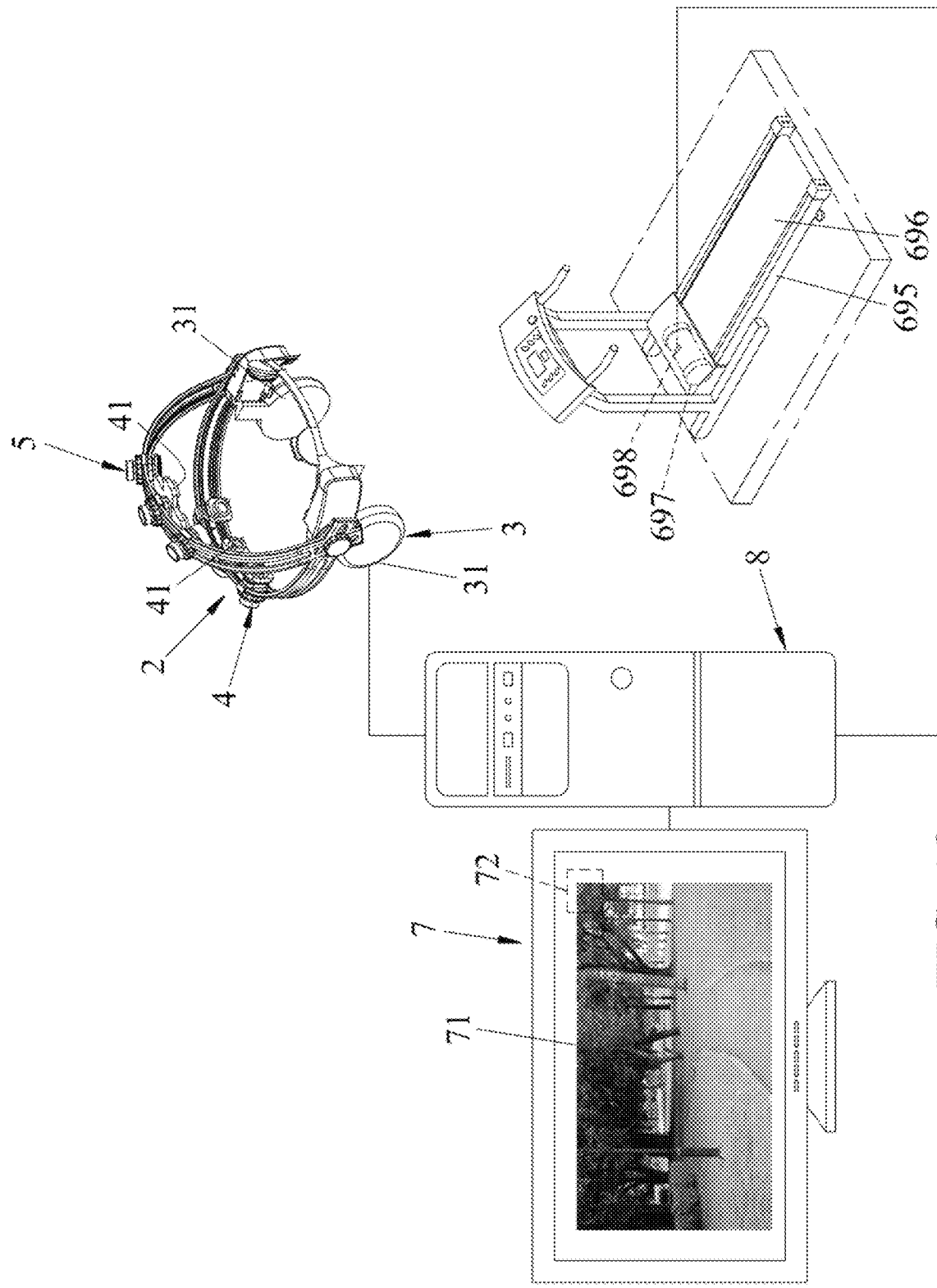
FIG. 19 is a schematic diagram of the tenth embodiment of the multi-stimulation neurorehabilitation assistant system of the present invention.

Referring to FIG. 19, a tenth embodiment of the present invention is similar to the first embodiment, with the differences that:

The display and optical frequency-flashed stimulation unit 7 is not arranged on the stand unit 2, but on the screen in front of the training unit 6. The control unit 8 only needs to display the virtual image 71 and the feedback sign 72 when the display and optical frequency-flashed stimulation unit 7 is in the display mode.

The training unit 6 includes a base 695, a running belt 696 that can rotate circularly relative to the base 695, a driving motor 697 that drives the running band 696 to rotate circularly, and a tachometer 698 for measuring the rotational speed of the running band 696 and connecting to the control unit 8.

When in use, the user stands on the running band 696 and controls the driving motor 697 to drive the running band 696 to rotate circularly. Then, the user can run along with the speed of the running band 696, and can do aerobic exercise. The control unit 8 will control the display and optical frequency-flashed stimulation unit 7 to display the image changes during running in the display mode, and the feedback sign 72 is corresponding to the rotation status of the running band 696.

In this way, the tenth embodiment can also achieve the same purpose and efficacy as the above-mentioned first embodiment.

Figure 20:
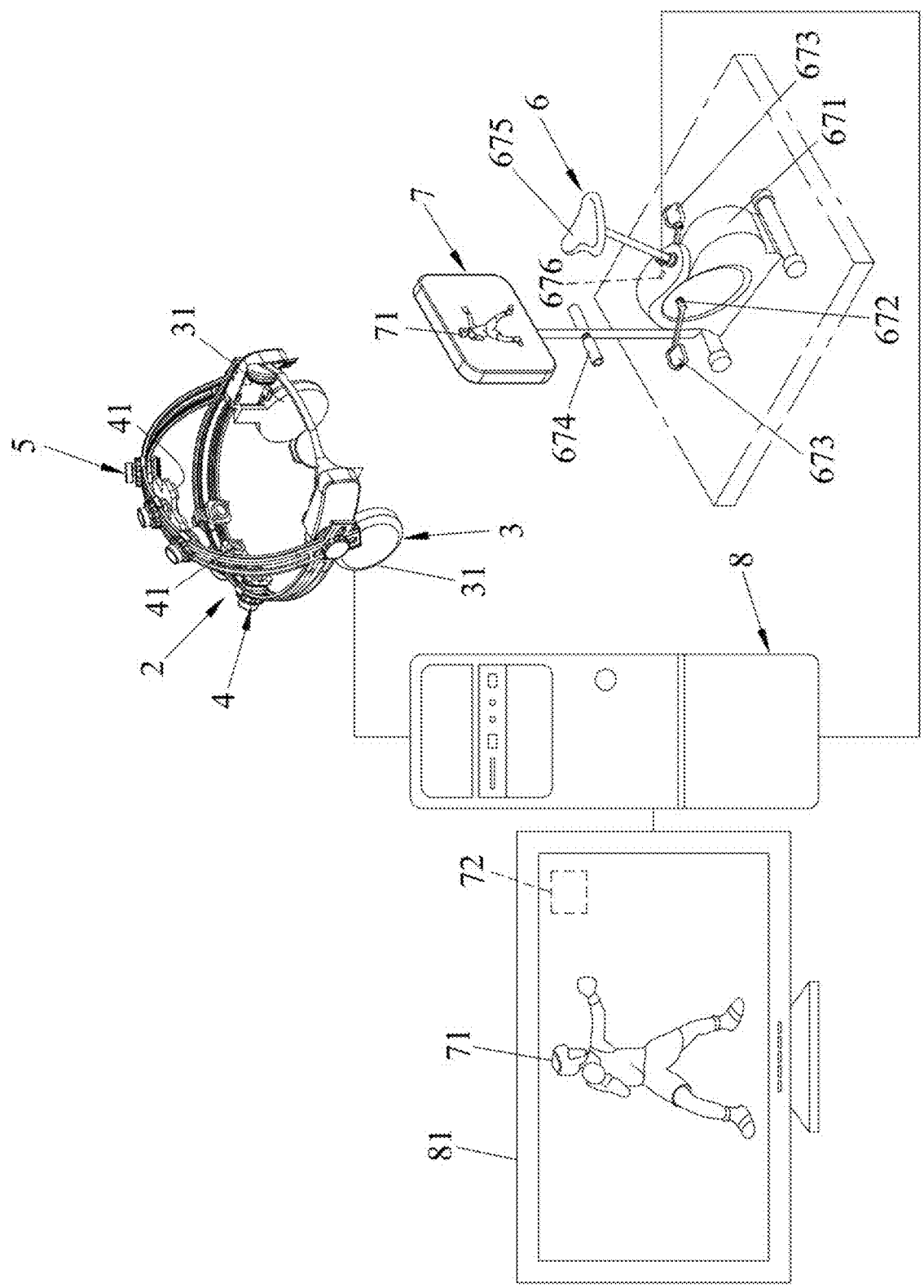
FIG. 20 is a schematic diagram of the eleventh embodiment of the multi-stimulation neurorehabilitation assistant system of the present invention.

Referring to FIG. 20, an eleventh embodiment of the present invention is similar to the seventh embodiment, with the differences that:

The display and optical frequency-flashed stimulation unit 7 is not arranged on the support unit 2, but is located on the touch screen of the handle frame 674.

When in use, the user first holds the handle frame 674 and sits on the seat 675, and steps on the pedals 673. The control unit 8 controls the display and optical frequency-flashed stimulation unit 7 to display, for example, the virtual image 71 of a boxer and the feedback sign 72 in the display mode. Then, the user steps on the pedals 673, so as to train the pedal action. When the control unit 8 receives the measurement signal generated by the torque sensor 676 in response to the rotation of the crank 672, it will control the scene in the virtual image 71 to change, such as changing the distance between the boxers. At this time, the user can swing the first on the virtual image 71 on the display and optical frequency-flashed stimulation unit 7 in the riding state, thus training the user's hand and foot coordination at the same time. The feedback sign 72 corresponds to the rotation status of the crank 672, and the displayed content is the number of rotations of the crank 672 calculated through the measurement signal.

In this way, the eleventh embodiment can also achieve the same purpose and efficacy as the above-mentioned first embodiment.

It should be noted that, in the aforementioned embodiments, the training unit 6 is not limited to one group, but can be used in combination with the corresponding virtual image 71 in multiple groups, and can train multiple parts at the same time. The training unit 6 can be other kinds of sports equipment besides the aforementioned disclosed equipment, and it is not limited to this.

To sum up, by arranging the speakers 31, the acupoint agents 41, the electronic stimulation agents 51, the training unit 6 and the display and optical frequency-flashed stimulation unit 7, the user can obtain multiple stimulation at the same time during rehabilitation, and the virtual image 71 can further provide fun and increase the user's willingness to use, so the purpose of the present invention can indeed be achieved.

However, the above are only examples of the present invention. While the scope of the present invention cannot be limited by this, all simple and equivalent changes and modifications made according to the patent application scope and the contents of the patent specification of the present invention are still within the scope of the present invention.

What is claimed is:

1. A multi-stimulation neurorehabilitation assistant system for use by a user, the multi-stimulation neurorehabilitation assistant system comprising:
   a support unit corresponds to the user's head shape, and includes two ear portions corresponding to both ears of the user, and a top-side portion rotatably connected between the ear portions and spanning upwardly over the top of the user's head;
   an audio stimulation unit includes two speakers respectively arranged on the ear portions, the speakers are used to broadcast binaural beats with frequency following response to the user's ears, and the binaural beats with frequency following response has an audio frequency difference;
   an acupoint stimulation unit includes several acupoint agents that are arranged on the support unit in an adjustable position manner, and the acupoint agents are used for physical stimulation of an irradiated light output to the acupoints of the user's head;
   an electronic stimulation unit includes several electronic stimulation agents that can be positioned at the support unit in a position-adjustable manner, the electronic stimulation agents used for outputting current to the user's head for transcranial electrical stimulation;
   a training unit configured to sense its own movement to output a measurement signal;
   a display and optical frequency-flashed stimulation unit configured to switch between a display mode and an optical frequency-flashed stimulation mode, in the display mode, the display and optical frequency-flashed stimulation unit is used for displaying images, in the optical frequency-flashed stimulation mode, the display and optical frequency-flashed stimulation unit are used for displaying a flickering picture; and
   a control unit is electrically connected to the speakers, the acupoint agents, the electronic stimulation agents, the training unit and the display and optical frequency-flashed stimulation unit, and stores digital information of the binaural beats with frequency following response and images, and according to a preset command, is configured to simultaneously control the speakers to broadcast the binaural beats with frequency following response, controls the acupoint agents to emit the physical stimulation, controls the electronic stimulation agents to emit the electrical stimulation, and controls the display and optical frequency-flashed stimulation unit to switch between the display mode and the optical frequency-flashed stimulation mode, and configured to receive the measurement signal and change the display mode images according to the measurement signal in the display mode;
   wherein the audio frequency difference of the binaural beats with frequency following response is between 16 Hz and 19 Hz, and the irradiated light of the acupoint agents is laser light with light wavelength between 500 nm and 900 nm and output power between 100 mW and 200 mW;
   wherein when the display and optical frequency-flashed stimulation unit is in the optical frequency-flashed stimulation mode, the flickering picture displayed by the display and optical frequency-flashed stimulation unit flickers at a predetermined optical flash frequency ranging from 30 Hz to 60 Hz in two eyes or stimulates both of the user's eyes with an optical frequency-flashed difference;
   wherein the support unit further comprises a back-side portion rotatably connected between the ears portions and spanning the back of the user's skull, and a front-side portion connected between the ears portions and spanning the eyes of the user forward, the top-side portion having a top area located at the center between the ears, and two side areas connected to the ears and the top area respectively, and one of the acupoint agents is adjustably arranged at the center of the top area to correspond to the user's Baihui acupoint, and four of these acupoint agents can be positioned at a distance of a finger distance from the center of the top area to correspond to the user's four Sishencong acupoints;
   wherein the electronic stimulation agents are respectively arranged at the side areas to respectively correspond to the C3 position and C4 position in the international 10-20 system electroencephalogram electrode position.

2. The multi-stimulation neurorehabilitation assistant system according to claim 1, wherein the display and optical frequency-flashed stimulation unit is arranged on the support unit and displays a virtual image for the eyes of the user in the display mode, and the control unit is configured to receive the measurement signal and change the virtual image according to the measurement signal.

3. The multi-stimulation neurorehabilitation assistant system according to claim 1, wherein the acupoint stimulation unit further comprises several resistance measurement agents electrically connected to the control unit and adjacent to the acupoint agents, and each of the resistance measurement agents is used for measuring the user's body resistance to confirm whether the corresponding acupoint agents are located in the low-resistance acupoint area.

4. The multi-stimulation neurorehabilitation assistant system according to claim 1, wherein the training unit comprises a pressure plate electrically connected to the control unit and outputting the measurement signal corresponding to a pressure condition, and the display and optical frequency-flashed stimulation unit also displays a feedback sign corresponding to the pressure condition of the pressure plate in the display mode.

5. The multi-stimulation neurorehabilitation assistant system according to claim 1, wherein the training unit comprises a door frame, a door panel pivotally connected to the door frame, and a door trigger switch which is arranged in one of the door frame and the door panel and electrically connected with the control unit to output the measurement signal corresponding to whether the door panel is closed or not relative to the door frame, and the display and optical frequency-flashed stimulation unit also displays a feedback sign corresponding to a pushed condition of the door panel in the display mode.

6. The multi-stimulation neurorehabilitation assistant system according to claim 1, wherein the training unit comprises a vertical plate, a door knob rotatably arranged on the vertical plate, and an angle sensor arranged on the door knob and electrically connected with the control unit to output the measurement signal corresponding to the rotation angle of the door knob, and the display and optical frequency-flashed stimulation unit also displays a feedback sign corresponding to a rotation status of the door knob in the display mode.

7. The multi-stimulation neurorehabilitation assistant system according to claim 1, wherein the training unit comprises a stand, a motor, a rotatable wheel rotatably arranged on the stand and controlled by the motor to rotate in a trend of returning to an initial position, a rope connected and wound around the rotatable wheel, and a torque sensor arranged on the motor and electrically connected with the control unit to output the measurement signal corresponding to a driving torque of the motor, and the display and optical frequency-flashed stimulation unit are displayed on the display.

8. The multi-stimulation neurorehabilitation assistant system according to claim 1, wherein the training unit comprises a glove kit for the user's hand, and several hand sensors arranged on the glove kit and electrically connected with the control unit to output the measurement signal corresponding to an action of the glove kit.

9. The multi-stimulation neurorehabilitation assistant system according to claim 1, wherein the training unit comprises a foot cover kit for the user's feet to wear, and a foot sensor arranged on the foot cover kits and electrically connected to the control unit to output the measurement signal corresponding to an action of the foot cover kits.

10. The multi-stimulation neurorehabilitation assistant system according to claim 1, wherein the training unit comprises a bicycle frame, a crank rotatably arranged on the bicycle frame, two pedals arranged on two opposite sides of the crank, a handle frame and a seat arranged on the bicycle frame, and a torque sensor arranged on the crank and electrically connected with the control unit to output the measurement signal corresponding to torque of the crank, and the display and optical frequency-flashed stimulation unit also displays a pair of feedback signs corresponding to a rotation status of the crank.

11. The multi-stimulation neurorehabilitation assistant system according to claim 1, wherein the training unit comprises a frame, a crank rotatably arranged on the bicycle frame, two pedals linked with each other and arranged on two opposite sides of the crank, two handles linked with the pedals respectively, and a torque sensor arranged on the crank and electrically connected with the control unit to output the measurement signal corresponding to torque of the crank, and the display and optical frequency-flashed stimulation unit also displays in the display mode.

12. The multi-stimulation neurorehabilitation assistant system according to claim 1, wherein the training unit comprises a base, a support frame extending upward from the base, a spring plate disposed on the base and behind the support frame and capable of swinging relative to the base, and a yaw sensor disposed at the bottom of the spring plate and electrically connected with the control unit to output the yaw angle corresponding to the spring plate, and the display and optical frequency-flashed stimulation unit also displays a pair of feedback signs corresponding to deflection of the spring plate in the display mode.

13. The multi-stimulation neurorehabilitation assistant system according to claim 1, wherein the training unit includes a base, a running band that can rotate relative to the base, and a drive motor that drives the running band to rotate cyclically, and a tachometer for measuring the rotational speed of the running band and electrically connected to the control unit, the display and optical frequency-flashed stimulation unit also displays a pair of feedback signs corresponding to a rotational status of the running belt in the display mode.

14. The multi-stimulation neurorehabilitation assistant system according to claim 1, wherein one of the acupoint agents is arranged on the back-side portion in a position-adjustable manner, relatively located at the center between the ears portions, and apart from the center of the top area, so as to correspond to the Fengfu acupoint; two of the acupoint agents are arranged on the back-side portion in a position-adjustable manner, seven times the finger distance backward of the center of the top area, and spaced apart from the ears portions by 2.25 times the finger distance to respectively correspond to two Fengchi acupoints.

15. The multi-stimulation neurorehabilitation assistant system according to claim 14, wherein the top-side portion is further provided with a first mounting slot, and the back-side portion is provided with a second mounting slot, and the support unit further comprises a plurality of first conductive strips arranged at the bottom of the top-side portion and a plurality of second conductive strips arranged at the front side of the back-side portion, and the acupoint stimulation unit further comprises a first setting base and a plurality of second mounting seats; the first setting base has a first sliding member disposed below the top area and the first conductive strips, a first screw locking member that passes through the first mounting slot from the side opposite to the top area and is screwed to the first sliding member to fix the first sliding member; a first positioning member passing through the first sliding member from the side opposite to the first sliding member, a first mounting platform arranged on the side opposite to the top area of the first sliding member and screwed to the first positioning member, and a plurality of the first conductive members passing through the first sliding member and the first mounting platform and electrically connecting the first conductive strips, respectively; at least one of the acupoint agents is arranged on the side of the first mounting platform opposite to the top area and electrically connected with the first conductive members; each second setting base has a second sliding member arranged in front of the back-side portion and the second conductive strips, a second screw locking member passing through the second mounting slot from the side opposite to the back-side portion and screwed to the second sliding member for fixing the second sliding member, a second positioning member passing through the second screw locking member from the side opposite to the second sliding member, a second mounting platform arranged on the side opposite to the back-side portion of the second sliding member and screwed to the second positioning member, and a plurality of the second conductive members passing through the second sliding member and the second mounting platform and electrically connecting the second conductive strips, respectively, and the other of the acupoint agents is arranged on the side opposite to the back-side portion of the second mounting platform and electrically connected with the second conductive members.

16. The multi-stimulation neurorehabilitation assistant system according to claim 14, wherein the top-side portion further has a first mounting slot, and the support unit further comprises several conductive strips disposed at the bottom of the top-side portion, the electronic stimulation unit further includes a third setting base and a fourth setting base; the third setting base has a third sliding member disposed under one of the side areas and the first conductive strips, a third screw locking member that passes through the first mounting slot from the side opposite to the top-side portion and is screwed to the third sliding member for fixing the third sliding member, a third positioning member slidably passing through the third sliding member from the side opposite to the third screw locking member, a third mounting platform arranged on the side opposite to the top-side portion of the third sliding member and screwed to the third positioning member, and a plurality of the third mounting platforms telescopically passing through the third sliding member and the third mounting platform and electrically connecting the first conductive strips respectively; one of the stimulation agents is disposed on a side of the third mounting platform opposite to the top-side portion and is electrically connected to the third conductive members, and the fourth setting base has a fourth sliding member disposed under the other of the side areas and the first conductive strips, a fourth screw locking member passing through the second mounting slot from the side opposite to the top-side portion and screwed to the fourth sliding member for fixing the fourth sliding member, a fourth positioning member slidably passing through the fourth sliding member from the side opposite to the fourth screw locking member, a fourth mounting platform arranged on the side opposite to the top-side portion of the fourth sliding member and screwed to the fourth positioning member, and a plurality of the fourth conductive members telescopically passing through the fourth sliding member and the fourth mounting platform and electrically connected to the first conductive strips respectively; the other one of the electronic stimulation agents is disposed on a side of the fourth mounting platform opposite to the top-side portion and is electrically connected to the fourth conductive members.

17. The multi-stimulation neurorehabilitation assistant system according to claim 16, wherein when one of the electronic stimulation agents is an output current type for outputting current to the user's head for transcranial electrical stimulation, the electronic stimulation agents for outputting current has several conductive pillars arranged in parallel to output physical stimulation, and is made of silicone electrode material.

18. The multi-stimulation neurorehabilitation assistant system according to claim 1, wherein the digital information and the preset command are downloaded through a cloud network and then pre-stored in the control unit.

* * * * *